(12) United States Patent
Sasata et al.

(10) Patent No.: US 11,650,448 B2
(45) Date of Patent: May 16, 2023

(54) LIQUID CRYSTAL DIFFRACTION ELEMENT AND LIGHT GUIDE ELEMENT

(71) Applicant: FUJIFILM Corporation, Tokyo (JP)

(72) Inventors: Katsumi Sasata, Minamiashigara (JP); Hiroshi Sato, Minamiashigara (JP); Yukito Saitoh, Minamiashigara (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 17/343,821

(22) Filed: Jun. 10, 2021

(65) Prior Publication Data

US 2021/0311352 A1 Oct. 7, 2021

Related U.S. Application Data

(63) Continuation of application No. PCT/JP2019/048481, filed on Dec. 11, 2019.

(30) Foreign Application Priority Data

Dec. 11, 2018 (JP) .............................. JP2018-231577

(51) Int. Cl.
  *G02F 1/1335* (2006.01)
  *F21V 8/00* (2006.01)
  (Continued)

(52) U.S. Cl.
  CPC ..... *G02F 1/133504* (2013.01); *G02B 6/0023* (2013.01); *G02B 27/022* (2013.01); *G02F 1/13363* (2013.01)

(58) Field of Classification Search
  CPC ............ G02F 2201/30; G02F 1/13363; G02F 1/133504; G02B 27/4272; G02B 5/30;
  (Continued)

(56) References Cited

U.S. PATENT DOCUMENTS

2001/0033400 A1* 10/2001 Sutherland ............ G02F 1/1326
  430/1
2007/0263152 A1* 11/2007 Mazaki ................ G02B 5/3083
  349/118
(Continued)

FOREIGN PATENT DOCUMENTS

CN  107092093 A  8/2017
JP  2009-69793 A  4/2009
(Continued)

OTHER PUBLICATIONS

International Preliminary Report on Patentability and Written Opinion of the International Searching Authority (Forms PCT/IB/373 and PCT/ISA/237) for International Application No. PCT/JP2019/048481, dated Jun. 8, 2021, with an English translation.
(Continued)

*Primary Examiner* — Mariam Qureshi
(74) *Attorney, Agent, or Firm* — Birch, Stewart, Kolasch & Birch, LLP

(57) ABSTRACT

Provided are a liquid crystal diffraction element that can make the brightness of light emitted from a light guide plate uniform and a light guide element. The liquid crystal diffraction element includes: an optically-anisotropic layer that is formed of a composition including a liquid crystal compound, in which the optically-anisotropic layer has a liquid crystal alignment pattern in which a direction of an optical axis derived from the liquid crystal compound continuously rotates in at least one in-plane direction, and a diffraction efficiency of the optically-anisotropic layer increases from one side to another side in the one in-plane direction.

10 Claims, 14 Drawing Sheets

(51) Int. Cl.
  *G02B 27/02* (2006.01)
  *G02F 1/13363* (2006.01)
(58) Field of Classification Search
  CPC .................. G02B 5/18; G02B 27/0172; G02B
        2027/0118; G02B 27/0081; G02B 6/0061;
        G02B 6/005; G02B 27/022; G02B 6/0023
  See application file for complete search history.

(56) References Cited

U.S. PATENT DOCUMENTS

| | | | |
|---|---|---|---|
| 2008/0143926 A1 | 6/2008 | Amimori et al. | |
| 2008/0278675 A1* | 11/2008 | Escuti | G02B 5/32 359/485.02 |
| 2009/0141324 A1 | 6/2009 | Mukawa | |
| 2011/0242461 A1* | 10/2011 | Escuti | H04N 9/3167 349/96 |
| 2016/0033698 A1 | 2/2016 | Escuti et al. | |
| 2016/0216591 A1* | 7/2016 | Seo | G02F 1/13306 |
| 2018/0143485 A1* | 5/2018 | Oh | G02B 5/1819 |
| 2018/0164480 A1 | 6/2018 | Yoshida | |
| 2018/0164627 A1* | 6/2018 | Oh | G02F 1/13718 |
| 2019/0094447 A1* | 3/2019 | Tan | G02B 6/002 |
| 2019/0212588 A1* | 7/2019 | Waldern | G02B 27/0944 |

FOREIGN PATENT DOCUMENTS

| | | |
|---|---|---|
| JP | 2009-133998 A | 6/2009 |
| JP | 5276847 B2 | 8/2013 |
| JP | 2017-522601 A | 8/2017 |
| WO | WO 2016/194961 A1 | 12/2016 |
| WO | WO 2017/180403 A1 | 10/2017 |
| WO | WO 2018/039273 A1 | 3/2018 |
| WO | WO 2018/094079 A1 | 5/2018 |
| WO | WO 2018/106963 A1 | 8/2018 |

OTHER PUBLICATIONS

International Search Report (Form PCT/ISA/210) for International Application No. PCT/JP2019/048481, dated Mar. 10, 2020, with an English translation.
Kress et al., "Towards the Ultimate Mixed Reality Experience: HoloLens Display Architecture Choices," Microsoft Corporation, 2017, pp. 127-131, 5 pages total.
Japanese Notice of Reasons for Refusal for corresponding Japanese Application No. 2020-559284, dated May 31, 2022, with an English translation.

* cited by examiner

LIQUID CRYSTAL DIFFRACTION ELEMENT AND LIGHT GUIDE ELEMENT

CROSS-REFERENCE TO RELATED APPLICATIONS

This application is a Continuation of PCT International Application No. PCT/JP2019/048481 filed on Dec. 11, 2019, which claims priority under 35 U.S.C. § 119(a) to Japanese Patent Application No. 2018-231577 filed on Dec. 11, 2018. The above application is hereby expressly incorporated by reference, in its entirety, into the present application.

BACKGROUND OF THE INVENTION

1. Field of the Invention

The present invention relates a liquid crystal diffraction element that diffracts incident light and a light guide element including the liquid crystal diffraction element.

2. Description of the Related Art

Recently, as described in Bernard C. Kress et al., Towards the Ultimate Mixed Reality Experience: HoloLens Display Architecture Choices, SID 2017 DIGEST, pp. 127-131, augmented reality (AR) glasses that display a virtual image and various information or the like to be superimposed on a scene that is actually being seen have been put into practice. The AR glasses are also called, for example, smart glasses or a head-mounted display (HMD).

As described in Bernard C. Kress et al., Towards the Ultimate Mixed Reality Experience: HoloLens Display Architecture Choices, SID 2017 DIGEST, pp. 127-131, in AR glasses, for example, an image displayed by a display (optical engine) is incident into one end of a light guide plate, propagates in the light guide plate, and is emitted from another end of the light guide plate such that the virtual image is displayed to be superimposed on a scene that a user is actually seeing.

In AR glasses, light (projection light) projected from a display is diffracted (refracted) using a diffraction element to be incident into one end portion of a light guide plate. As a result, light is introduced into the light guide plate with an angle and propagates up to another end portion in the light guide plate while being reflected from an interface (surface) of the light guide plate. The light propagated in the light guide plate is also diffracted by the diffraction element in the other end portion of the light guide plate and is emitted from the light guide plate to an observation position by the user.

As this diffraction grating, a diffraction element formed of liquid crystal is known.

For example, JP2017-522601A describes an optical element comprising a plurality of stacked birefringent sublayers configured to alter a direction of propagation of light transmitting therethrough according to a Bragg condition, in which the stacked birefringent sublayers respectively comprise local optical axes that vary along respective interfaces between adjacent ones of the stacked birefringent sublayers to define respective grating periods. The optical element described in JP2017-522601A diffracts transmitted light. JP2017-522601A describes that light incident into a substrate (light guide plate) is diffracted by an optical element such that the light is incident at angle at which the light is totally reflected in the substrate and is guided in a direction substantially perpendicular to the incidence direction of the light in the substrate (refer to FIG. 8 of JP2017-522601A).

JP5276847B describes a polarization diffraction grating comprising: a polarization sensitive photo-alignment layer; and at least first and second liquid crystal compositions that include a polymerizable mesogen and are arranged on the photo-alignment layer, in which an anisotropic alignment pattern corresponding to a polarization hologram is arranged in the photo-alignment layer, the first liquid crystal composition is arranged on and aligned by the alignment layer and at least partly polymerized, the second liquid crystal composition is arranged on and aligned by the first liquid crystal composition, and both the liquid crystal compositions have a thickness d of a layer determined by the formula $d \leq d_{max} = \Lambda/2$, where d represents the thickness of the layer and $\Lambda$ represents a pitch of the polarization diffraction grating.

WO2016/194961A discloses a reflective structure comprising: a plurality of helical structures each extending in a predetermined direction; a first incidence surface that intersects the predetermined direction and into which light is incident; and a reflecting surface that intersects the predetermined direction and reflects the light incident from the first incidence surface, in which the first incidence surface includes one of end portions in each of the plurality of helical structures, each of the plurality of helical structures includes a plurality of structural units that lies in the predetermined direction, each of the plurality of structural units includes a plurality of elements that are helically turned and laminated, each of the plurality of structural units includes a first end portion and a second end portion, the second end portion of one structural unit among structural units adjacent to each other in the predetermined direction forms the first end portion of the other structural unit, alignment directions of the elements positioned in the plurality of first end portions included in the plurality of helical structures are aligned, the reflecting surface includes at least one first end portion included in each of the plurality of helical structures, and the reflecting surface is not parallel to the first incidence surface.

Here, in AR glasses, in a case where light propagated in a light guide plate is diffracted by a diffraction element after adjusting the diffraction efficiency of the diffraction element, it is known that a viewing zone expands (exit pupil expansion) with a configuration in which a part of light is diffracted at a plurality of positions to be emitted to the outside of the light guide plate.

For example, WO2017/180403A describes an optical waveguide including an input-coupler (diffraction element), in which the input-coupler couples light corresponding to an image and having a corresponding field of view (FOV) into the optical waveguide, splits the FOV of the image coupled into the optical waveguide into first and second portions, and diffracts a portion of the light corresponding to the image in a second direction toward a second-intermediate component, and an intermediate coupler (diffraction element) and an output-coupler (diffraction element) performs exit pupil expansion.

SUMMARY OF THE INVENTION

In a case where a liquid crystal diffraction element is used as a diffraction element of a light guide element used in AR glasses and diffracts a part of light at a plurality of positions to be emitted to the outside of the light guide plate for viewing zone expansion (exit pupil expansion) of AR glasses, there is a problem in that the brightness (light amount) of light emitted from the light guide plate is non-uniform in a case where the diffraction efficiency in a plane of the liquid crystal diffraction element is uniform.

An object of a first aspect of the present invention is to solve the above-described problems of the related art and to provide a liquid crystal diffraction element that can make the brightness of light emitted from a light guide plate uniform, and a light guide element.

In order to achieve the object, the present invention has the following configurations.

[1] A liquid crystal diffraction element comprising:
an optically-anisotropic layer that is formed of a composition including a liquid crystal compound,
in which the optically-anisotropic layer has a liquid crystal alignment pattern in which a direction of an optical axis derived from the liquid crystal compound continuously rotates in at least one in-plane direction, and
a diffraction efficiency of the optically-anisotropic layer increases from one side to another side in the one in-plane direction.

[2] The liquid crystal diffraction element according to [1],
in which the optically-anisotropic layer has a liquid crystal alignment pattern in which a direction of an optical axis derived from the liquid crystal compound continuously rotates in one in-plane direction.

[3] The liquid crystal diffraction element according to [1] or [2],
in which a diffraction efficiency of the optically-anisotropic layer continuously increases from one side to another side in the one in-plane direction.

[4] The liquid crystal diffraction element according to [1] or [2],
in which a diffraction efficiency of the optically-anisotropic layer increases stepwise from one side to another side in the one in-plane direction.

[5] The liquid crystal diffraction element according to any one of [1] to [4],
in which a thickness of the optically-anisotropic layer increases from one side to another side in the one in-plane direction such that a diffraction efficiency of the optically-anisotropic layer increases.

[6] The liquid crystal diffraction element according to any one of [1] to [4],
in which a thickness-direction retardation Rth of the optically-anisotropic layer increases from one side to another side in the one in-plane direction such that a diffraction efficiency of the optically-anisotropic layer increases.

[7] The liquid crystal diffraction element according to any one of [1] to [6],
in which in the optically-anisotropic layer, the liquid crystal compound is cholesterically aligned.

[8] The liquid crystal diffraction element according to any one of [1] to [7],
in which the liquid crystal compound has at least one radical reactive group and at least one cationic reactive group.

[9] A light guide element comprising:
a light guide plate; and
the liquid crystal diffraction element according to any one of [1] to [8] that is disposed on a surface of the light guide plate,
in which the liquid crystal diffraction element is disposed such that a diffraction efficiency of the optically-anisotropic layer increases in a traveling direction of light in the light guide plate.

[10] An AR display device comprising:
the light guide element according to [9]; and
an image display device.

According to the present invention, it is possible to provide a liquid crystal diffraction element that can make the brightness of light emitted from a light guide plate uniform and a light guide element.

DESCRIPTION OF THE PREFERRED EMBODIMENTS

Figure 1:
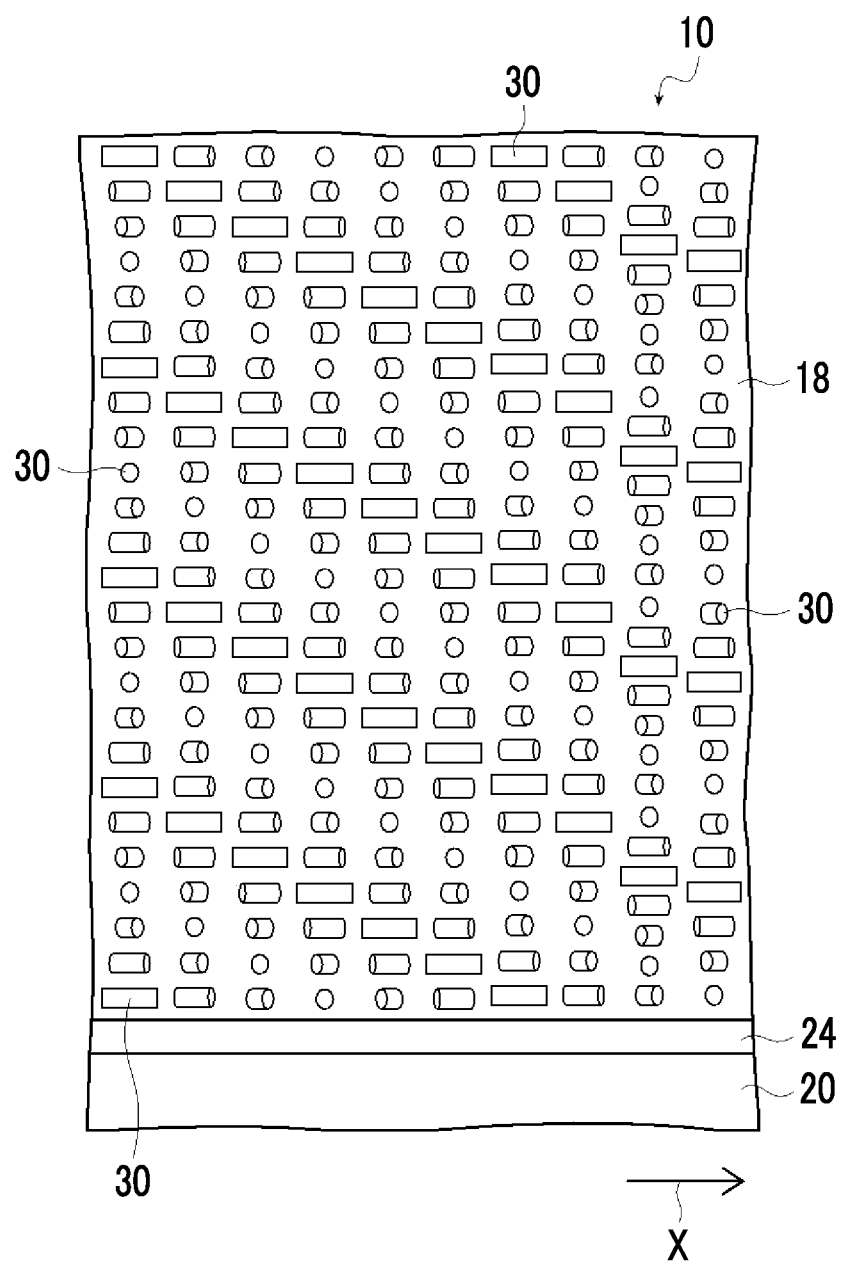
FIG. 1 is a conceptual diagram showing an example of a first embodiment of a liquid crystal diffraction element according to the present invention.

Hereinafter, a liquid crystal diffraction element and a light guide element according to an embodiment of the present invention will be described in detail based on a preferred embodiment shown in the accompanying drawings.

In the present specification, numerical ranges represented by "to" include numerical values before and after "to" as lower limit values and upper limit values.

In the present specification, "(meth)acrylate" represents "either or both of acrylate and methacrylate".

In the present specification, the meaning of "the same" includes a case where an error range is generally allowable in the technical field. In addition, in the present specification, the meaning of "all", "entire", or "entire surface" includes not only 100% but also a case where an error range is generally allowable in the technical field, for example, 99% or more, 95% or more, or 90% or more. In addition, "perpendicular" or "parallel" regarding an angle represents a range of the exact angle±5°, and "the same" regarding an angle represents that a difference from the exact angle is less than 5 degrees unless specified otherwise. The difference from the exact angle is preferably less than 4 degrees and more preferably less than 3 degrees.

In the present specification, visible light refers to light which can be observed by human eyes among electromagnetic waves and refers to light in a wavelength range of 380 to 780 nm. Invisible light refers to light in a wavelength range of shorter than 380 nm or longer than 780 nm.

In addition, although not limited thereto, in visible light, light in a wavelength range of 420 to 490 nm refers to blue light, light in a wavelength range of 495 to 570 nm refers to green light, and light in a wavelength range of 620 to 750 nm refers to red light.

In the present specification, a selective reflection center wavelength refers to an average value of two wavelengths at which, in a case where a minimum value of a transmittance of a target object (member) is represented by Tmin (%), a half value transmittance: T½(%) represented by the following expression is exhibited.

Expression for obtaining Half Value Transmittance:
$T\frac{1}{2} = 100 - (100 - Tmin) \div 2$ In addition, selective reflection center wavelengths of a plurality of layers being "equal" does not represent that the selective reflection center wavelengths are exactly equal, and error is allowed in a range where there are no optical effects. Specifically, selective reflection center wavelengths of a plurality of objects being "equal" represents a difference between the selective reflection center wavelengths of the respective objects is 20 nm or less, and this difference is preferably 15 nm or less and more preferably 10 nm or less.

A retardation value is measured using "Axoscan" (manufactured by Axometrics, Inc.). The measurement wavelength was set to 750 nm. A phase difference with respect to incidence light from a normal direction of a sample surface is measured. A phase difference is measured from directions having incidence angles of −40° and 40° in each of a slow axis plane and a fast axis plane that were detected, and an average value of the measured values in the four directions was obtained as an oblique-direction retardation Re (40).

The liquid crystal diffraction element according to the embodiment of the present invention comprises:
an optically-anisotropic layer that is formed of a composition including a liquid crystal compound,
in which the optically-anisotropic layer has a liquid crystal alignment pattern in which a direction of an optical axis derived from the liquid crystal compound continuously rotates in at least one in-plane direction, and
a diffraction efficiency of the optically-anisotropic layer increases from one side to another side in the one in-plane direction.

Although described below in detail, the liquid crystal diffraction element according to the embodiment of the present invention includes the above-described structure such that the brightness of emitted light can be made uniform in a case where light propagated in a light guide plate is diffracted by the liquid crystal diffraction element to be emitted from the light guide plate.

First Embodiment

FIG. 1 conceptually shows a first embodiment of the liquid crystal diffraction element according to the present invention.

A liquid crystal diffraction element 10 shown in FIG. 1 is a liquid crystal diffraction element that selectively reflects light having a specific wavelength and diffracts the reflected light.

The liquid crystal diffraction element 10 shown in FIG. 1 has a configuration in which a support 20, an alignment film 24, and an optically-anisotropic layer 18 are laminated in this order.

The liquid crystal diffraction element 10 shown in FIG. 1 includes the support 20 and the alignment film 24. However, the liquid crystal diffraction element according to the embodiment of the present invention may be configured not to include the support 20 or the alignment film 24.

For example, the liquid crystal diffraction element according to the embodiment of the present invention may consist of only the alignment film 24 and the optically-anisotropic layer 18 by peeling off the support 20 from the above-described configuration. Alternatively, the liquid crystal diffraction element may consist of only the optically-anisotropic layer 18 by peeling off the support 20 and the alignment film 24 from the above-described configuration.

That is, the liquid crystal diffraction element according to the embodiment of the present invention can adopt various layer configurations as long as it includes an optically-anisotropic layer has a liquid crystal alignment pattern in which a direction of an optical axis derived from a liquid crystal compound changes while continuously rotating in at least one in-plane direction and has a configuration in which a diffraction efficiency increases from one side to another side in the one in-plane direction in which the optical axis derived from the liquid crystal compound rotates.

The above-described point can be applied to all the liquid crystal diffraction elements according to respective aspects of the present invention described below.

<Support>

The support 20 is a film-like material (sheet-shaped material or plate-shaped material) that supports the alignment film 24 and the optically-anisotropic layer 18.

A transmittance of the support 20 with respect to light to be diffracted from the optically-anisotropic layer 18 is preferably 50% or higher, more preferably 70% or higher, and still more preferably 85% or higher.

The thickness of the support 20 is not particularly limited and may be appropriately set depending on the use of the liquid crystal diffraction element 10, a material for forming the support 20, and the like in a range where the alignment film 24 and the optically-anisotropic layer 18 can be supported.

The thickness of the support 20 is preferably 1 to 1000 µm, more preferably 3 to 250 µm, and still more preferably 5 to 150 µm.

The support 20 may have a single-layer structure or a multi-layer structure.

As a material of the support 20 having the single-layer structure, various materials used as a material of a support in an optical element can be used.

Specifically, examples of the material of the support 20 include glass, triacetyl cellulose (TAC), polyethylene terephthalate (PET), polycarbonates, polyvinyl chloride, acryl, and polyolefin. In a case where the support 20 has a multi-layer structure, examples thereof include a support including: one of the above-described supports having a single-layer structure that is provided as a substrate; and another layer that is provided on a surface of the substrate.

<Alignment Film>

The alignment film 24 is formed on the surface of the support 20.

The alignment film 24 is an alignment film for aligning the liquid crystal compound 30 to the predetermined liquid crystal alignment pattern during the formation of the optically-anisotropic layer 18.

Although described below, in the liquid crystal diffraction element 10 according to the embodiment of the present invention, the optically-anisotropic layer has a liquid crystal alignment pattern in which a direction of an optical axis 30A (refer to FIG. 2) derived from the liquid crystal compound 30 changes while continuously rotating in one in-plane direction.

Figure 2:
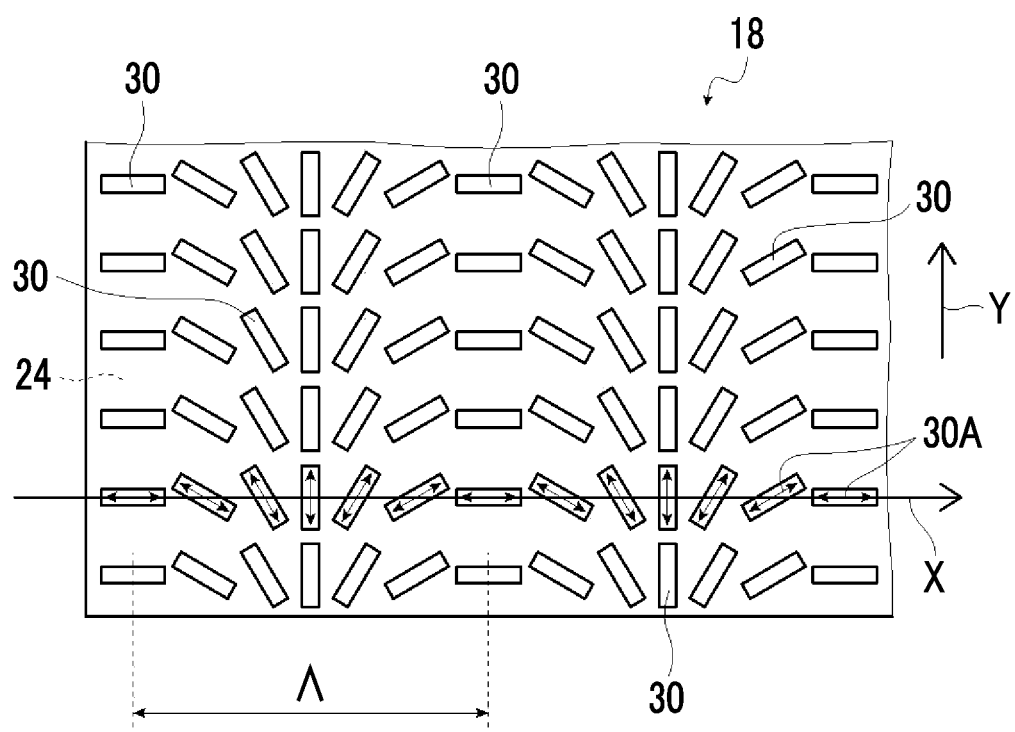
FIG. 2 is a top view of an optically-anisotropic layer of FIG. 1.

In the present invention, in a case where a length over which the direction of the optical axis 30A rotates by 180° in the one in-plane direction in which the direction of the optical axis 30A changes while continuously rotating in the liquid crystal alignment pattern is set as a single period (symbol A in FIG. 2, also simply referred to as "rotation period of the optical axis").

In the following description, "the direction of the optical axis 30A rotates" will also be simply referred to as "the optical axis 30A rotates".

As the alignment film, various well-known films can be used.

Examples of the alignment film include a rubbed film formed of an organic compound such as a polymer, an obliquely deposited film formed of an inorganic compound, a film having a microgroove, and a film formed by lamination of Langmuir-Blodgett (LB) films formed with a Langmuir-Blodgett's method using an organic compound such as co-tricosanoic acid, dioctadecylmethylammonium chloride, or methyl stearate.

The alignment film formed by a rubbing treatment can be formed by rubbing a surface of a polymer layer with paper or fabric in a given direction multiple times.

As the material used for the alignment film, for example, a material for forming polyimide, polyvinyl alcohol, a polymer having a polymerizable group described in JP1997-152509A (JP-H9-152509A), or an alignment film such as JP2005-097377A, JP2005-099228A, and JP2005-128503A is preferable.

In the liquid crystal diffraction element 10 according to the embodiment of the present invention, for example, the alignment film can be suitably used as a so-called photo-alignment film obtained by irradiating a photo-alignable material with polarized light or non-polarized light. That is, in the liquid crystal diffraction element 10 according to the embodiment of the present invention, a photo-alignment film that is formed by applying a photo-alignable material to the support 20 is suitably used as the alignment film.

The irradiation of polarized light can be performed in a direction perpendicular or oblique to the photo-alignment film, and the irradiation of non-polarized light can be performed in a direction oblique to the photo-alignment film.

Preferable examples of the photo-alignable material used in the photo-alignment film that can be used in the present invention include: an azo compound described in JP2006-285197A, JP2007-076839A, JP2007-138138A, JP2007-094071A, JP2007-121721A, JP2007-140465A, JP2007-156439A, JP2007-133184A, JP2009-109831A, JP3883848B, and JP4151746B; an aromatic ester compound described in JP2002-229039A; a maleimide- and/or alkenyl-substituted nadiimide compound having a photo-alignable unit described in JP2002-265541A and JP2002-317013A; a photocrosslinking silane derivative described in JP4205195B and JP4205198B, a photocrosslinking polyimide, a photocrosslinking polyamide, or a photocrosslinking polyester described in JP2003-520878A, JP2004-529220A, and JP4162850B; and a photodimerizable compound, in particular, a cinnamate compound, a chalcone compound, or a coumarin compound described in JP1997-118717A (JP-H9-118717A), JP1998-506420A (JP-H10-506420A), JP2003-505561A, WO2010/150748A, JP2013-177561A, and JP2014-012823A.

Among these, an azo compound, a photocrosslinking polyimide, a photocrosslinking polyamide, a photocrosslinking polyester, a cinnamate compound, or a chalcone compound is suitability used.

The thickness of the alignment film is not particularly limited. The thickness with which a required alignment function can be obtained may be appropriately set depending on the material for forming the alignment film.

The thickness of the alignment film is preferably 0.01 to 5 μm and more preferably 0.05 to 2 μm.

A method of forming the alignment film is not limited. Any one of various well-known methods corresponding to a material for forming the alignment film can be used. For example, a method including: applying the alignment film to a surface of the support 20; drying the applied alignment film; and exposing the alignment film to laser light to form an alignment pattern can be used.

Figure 3:
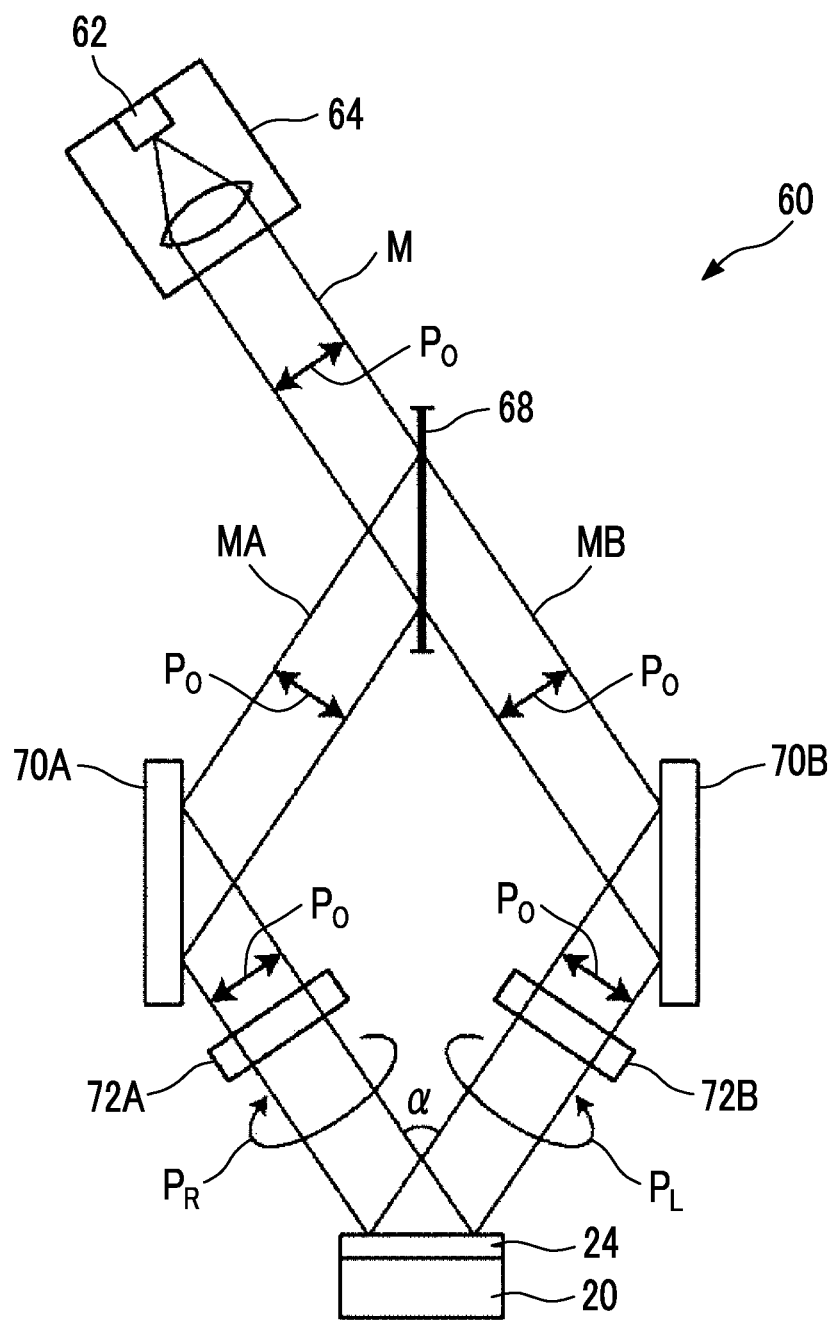
FIG. 3 is a conceptual diagram showing an example of an exposure device that exposes an alignment film.

FIG. 3 conceptually shows an example of an exposure device that exposes the alignment film to form an alignment pattern.

An exposure device 60 shown in FIG. 3 includes: a light source 64 that includes a laser 62 and an λ/2 plate (not shown); a polarization beam splitter 68 that splits laser light M emitted from the light source 64 into two beams MA and MB; mirrors 70A and 70B that are disposed on optical paths of the splitted two beams MA and MB; and λ/4 plates 72A and 72B.

Although not shown in the drawing, the light source 64 includes the λ/2 plate, and the λ/2 plate changes a polarization direction of laser light M emitted from the laser 62 to emit linearly polarized light $P_0$. The λ/4 plates 72A and 72B have optical axes parallel to each other. The 214 plate 72A converts the linearly polarized light $P_0$ (beam MA) into right circularly polarized light $P_R$, and the λ/4 plate 72B converts the linearly polarized light $P_0$ (beam MB) into left circularly polarized light $P_L$.

The support 20 including the alignment film 24 on which the alignment pattern is not yet formed is disposed at an exposed portion, the two beams MA and MB intersect and interfere each other on the alignment film 24, and the alignment film 24 is irradiated with and exposed to the interference light.

Due to the interference in this case, the polarization state of light with which the alignment film 24 is irradiated periodically changes according to interference fringes. As a result, in the alignment film 24, an alignment pattern in which the alignment state periodically changes can be obtained.

In the exposure device 60, by changing an intersecting angle α between the two beams MA and MB, the period of the alignment pattern can be adjusted. That is, by adjusting the intersecting angle α in the exposure device 60, in the alignment pattern in which the optical axis 30A derived from the liquid crystal compound 30 continuously rotates in the one in-plane direction, the length of the single period over which the optical axis 30A rotates by 180° in the one in-plane direction in which the optical axis 30A rotates can be adjusted.

By forming the cholesteric liquid crystal layer on the alignment film having the alignment pattern in which the alignment state periodically changes, as described below, the optically-anisotropic layer 18 having the liquid crystal alignment pattern in which the optical axis 30A derived from the liquid crystal compound 30 continuously rotates in the one in-plane direction can be formed.

In addition, by rotating the optical axes of the 214 plates 72A and 72B by 90°, respectively, the rotation direction of the optical axis 30A can be reversed.

In the liquid crystal diffraction element according to the embodiment of the present invention, the alignment film is provided as a preferable aspect and is not an essential component.

For example, the following configuration can also be adopted, in which, by forming the alignment pattern on the support 20 using a method of rubbing the support 20, a method of processing the support 20 with laser light or the like, or the like, the cholesteric liquid crystal layer or the like has the liquid crystal alignment pattern in which the direction of the optical axis 30A derived from the liquid crystal compound 30 changes while continuously rotating in at least one in-plane direction.

<Optically-Anisotropic Layer>

The optically-anisotropic layer 18 is formed on the surface of the alignment film 24.

The optically-anisotropic layer 18 is a layer that is formed of a composition including a liquid crystal compound, and has a liquid crystal alignment pattern in which a direction of an optical axis derived from the liquid crystal compound continuously rotates in at least one in-plane direction.

In the example shown in FIG. 1, the optically-anisotropic layer 18 has a configuration in which the liquid crystal compound is cholesterically aligned. That is, the optically-anisotropic layer 18 is a layer obtained by immobilizing a cholesteric liquid crystalline phase, and has a cholesteric liquid crystal structure in which the liquid crystal compound is helically twisted and aligned along an helical axis parallel to a thickness direction. In the optically-anisotropic layer 18, a configuration in which the liquid crystal compound 30 is helically rotated once (rotated by 360) is set as one helical pitch, and plural pitches of the helically turned liquid crystal compound 30 are laminated.

The optically-anisotropic layer 18 having the cholesteric liquid crystal structure has wavelength selective reflection properties.

For example, in a case where the optically-anisotropic layer 18 has a selective reflection center wavelength in a green wavelength range, the optically-anisotropic layer 18 reflects right circularly polarized light $G_R$ of green light and allows transmission of the other light.

Here, since the liquid crystal compound 30 rotates to be aligned in a plane direction, the optically-anisotropic layer 18 diffracts (refracts) incident circularly polarized light to be reflected in a direction in which the direction of the optical axis continuously rotates. In this case, the diffraction direction varies depending on the turning direction of incident circularly polarized light.

That is, the optically-anisotropic layer 18 reflects right circularly polarized light or left circularly polarized light having a selective reflection wavelength and diffracts the reflected light.

In addition, the optically-anisotropic layer 18 changes a turning direction of the reflected circularly polarized light into an opposite direction.

<<Cholesteric Liquid Crystalline Phase>>

The cholesteric liquid crystalline phase exhibits selective reflection properties with respect to left or circularly polarized light at a specific wavelength.

The center wavelength λ of selective reflection (selective reflection center wavelength λ) depends on a pitch P (=helical period) of a helical structure in the cholesteric liquid crystalline phase and satisfies a relationship of $\lambda = n \times P$ with an average refractive index n of the cholesteric liquid crystalline phase. Therefore, the selective reflection center wavelength can be adjusted by adjusting the pitch of the helical structure. The pitch of the cholesteric liquid crystalline phase depends on the kind of a chiral agent which is used in combination with a liquid crystal compound during the formation of the optically-anisotropic layer, or the concentration of the chiral agent added. Therefore, a desired pitch can be obtained by adjusting the kind and concentration of the chiral agent.

The details of the adjustment of the pitch can be found in "Fuji Film Research&Development" No. 50 (2005), pp. 60 to 63. As a method of measuring a helical sense and a helical pitch, a method described in "Introduction to Experimental Liquid Crystal Chemistry", (the Japanese Liquid Crystal Society, 2007, Sigma Publishing Co., Ltd.), p. 46, and "Liquid Crystal Handbook" (the Editing Committee of Liquid Crystal Handbook, Maruzen Publishing Co., Ltd.), p. 196 can be used.

Whether or not the reflected light from the cholesteric liquid crystalline phase is right circularly polarized light or left circularly polarized light is determined depending on a helical twisted direction (sense) of the cholesteric liquid crystalline phase. Regarding the selective reflection of the circularly polarized light by the cholesteric liquid crystalline phase, in a case where the helical twisted direction of the cholesteric liquid crystalline phase is right, right circularly polarized light is reflected, and in a case where the helical twisted direction of the cholesteric liquid crystalline phase is left, left circularly polarized light is reflected.

Accordingly, in the liquid crystal diffraction element 10 shown in FIG. 1, the optically-anisotropic layer 18 is a layer obtained by immobilizing a right-twisted cholesteric liquid crystalline phase.

A turning direction of the cholesteric liquid crystalline phase can be adjusted by adjusting the kind of the liquid crystal compound that forms the optically-anisotropic layer and/or the kind of the chiral agent to be added.

In addition, a half-width Δλ (nm) of a selective reflection range (circularly polarized light reflection range) where selective reflection is exhibited depends on Δn of the cholesteric liquid crystalline phase and the helical pitch P and complies with a relationship of $\Delta\lambda = \Delta n \times P$. Therefore, the width of the selective reflection range can be controlled by adjusting Δn. Δn can be adjusted by adjusting a kind of a liquid crystal compound for forming the optically-anisotropic layer and a mixing ratio thereof, and a temperature during aligned immobilization.

The half-width of the reflection wavelength range is adjusted depending on the use of the liquid crystal diffraction element 10 and may be, for example, 10 to 500 nm and is preferably 20 to 300 nm and more preferably 30 to 100 nm.

<<Method of Forming Optically-Anisotropic Layer Having Cholesteric Liquid Crystal Structure>>

The optically-anisotropic layer having the cholesteric liquid crystal structure can be formed by immobilizing a cholesteric liquid crystalline phase in a layer shape.

The structure in which a cholesteric liquid crystalline phase is immobilized may be a structure in which the alignment of the liquid crystal compound as a cholesteric liquid crystalline phase is immobilized. Typically, the structure in which a cholesteric liquid crystalline phase is immobilized is preferably a structure which is obtained by making the polymerizable liquid crystal compound to be in a state where a cholesteric liquid crystalline phase is aligned, polymerizing and curing the polymerizable liquid crystal compound with ultraviolet irradiation, heating, or the like to form a layer having no fluidity, and concurrently changing the state of the polymerizable liquid crystal compound into a state where the aligned state is not changed by an external field or an external force.

The structure in which a cholesteric liquid crystalline phase is immobilized is not particularly limited as long as the optical characteristics of the cholesteric liquid crystalline phase are maintained, and the liquid crystal compound 30 in the optically-anisotropic layer does not necessarily exhibit liquid crystallinity. For example, the molecular weight of the polymerizable liquid crystal compound may be increased by a curing reaction such that the liquid crystallinity thereof is lost.

Examples of a material used for forming the optically-anisotropic layer obtained by immobilizing a cholesteric liquid crystalline phase include a liquid crystal composition including a liquid crystal compound. It is preferable that the liquid crystal compound is a polymerizable liquid crystal compound.

In addition, the liquid crystal composition used for forming the optically-anisotropic layer may further include a surfactant and a chiral agent.

——Polymerizable Liquid Crystal Compound——

The polymerizable liquid crystal compound may be a rod-shaped liquid crystal compound or a disk-shaped liquid crystal compound.

Examples of the rod-shaped polymerizable liquid crystal compound for forming the cholesteric liquid crystalline phase include a rod-shaped nematic liquid crystal compound. As the rod-shaped nematic liquid crystal compound, an azomethine compound, an azoxy compound, a cyanobiphenyl compound, a cyanophenyl ester compound, a benzoate compound, a phenyl cyclohexanecarboxylate compound, a cyanophenylcyclohexane compound, a cyano-substituted phenylpyrimidine compound, an alkoxy-substituted phenylpyrimidine compound, a phenyldioxane compound, a tolan compound, or an alkenylcyclohexylbenzonitrile compound is preferably used. Not only a low-molecular-weight liquid crystal compound but also a high-molecular-weight liquid crystal compound can be used.

The polymerizable liquid crystal compound can be obtained by introducing a polymerizable group into the liquid crystal compound. Examples of the polymerizable group include an unsaturated polymerizable group, an epoxy group, and an aziridinyl group. Among these, an unsaturated polymerizable group is preferable, and an ethylenically unsaturated polymerizable group is more preferable. The polymerizable group can be introduced into the molecules of the liquid crystal compound using various methods. The number of polymerizable groups in the polymerizable liquid crystal compound is preferably 1 to 6 and more preferably 1 to 3.

Examples of the polymerizable liquid crystal compound include compounds described in Makromol. Chem. (1989), Vol. 190, p. 2255, Advanced Materials (1993), Vol. 5, p. 107, U.S. Pat. Nos. 4,683,327A, 5,622,648A, 5,770,107A, WO95/022586, WO95/024455, WO97/000600, WO98/023580, WO98/052905, JP1989-272551A (JP-H1-272551A), JP1994-016616A (JP-H6-016616A), JP1995-110469A (JP-H7-110469A), JP1999-080081A (JP-H11-080081A), and JP2001-328973A. Further, as the rod-shaped liquid crystal compound, for example, compounds described in JP1999-513019A (JP-H11-513019A) and JP2007-279688A can be preferably used. Two or more polymerizable liquid crystal compounds may be used in combination. In a case where two or more polymerizable liquid crystal compounds are used in combination, the alignment temperature can be decreased.

In addition, as a polymerizable liquid crystal compound other than the above-described examples, for example, a cyclic organopolysiloxane compound having a cholesteric phase described in JP1982-165480A (JP-S57-165480A) can be used. Further, as the above-described high-molecular-weight liquid crystal compound, for example, a polymer in which a liquid crystal mesogenic group is introduced into a main chain, a side chain, or both a main chain and a side chain, a polymer cholesteric liquid crystal in which a cholesteryl group is introduced into a side chain, a liquid crystal polymer described in JP1997-133810A (JP-H9-133810A), and a liquid crystal polymer described in JP1999-293252A (JP-H11-293252A) can be used.

——Disk-Shaped Liquid Crystal Compound——

As the disk-shaped liquid crystal compound, for example, compounds described in JP2007-108732A and JP2010-244038A can be preferably used.

In addition, the addition amount of the polymerizable liquid crystal compound in the liquid crystal composition is preferably 75% to 99.9 mass %, more preferably 80% to 99 mass %, and still more preferably 85% to 90 mass % with respect to the solid content mass (mass excluding a solvent) of the liquid crystal composition.

——Surfactant——

The liquid crystal composition used for forming the optically-anisotropic layer may include a surfactant.

It is preferable that the surfactant is a compound that can function as an alignment controller contributing to the stable or rapid formation of a cholesteric liquid crystalline phase with planar alignment. Examples of the surfactant include a silicone surfactant and a fluorine surfactant. Among these, a fluorine surfactant is preferable.

Specific examples of the surfactant include compounds described in paragraphs "0082" to "0090" of JP2014-119605A, compounds described in paragraphs "0031" to "0034" of JP2012-203237A, exemplary compounds described in paragraphs "0092" and "0093" of JP2005-099248A, exemplary compounds described in paragraphs "0076" to "0078" and paragraphs "0082" to "0085" of JP2002-129162A, and fluorine (meth)acrylate polymers described in paragraphs "0018" to "0043" of JP2007-272185A.

As the surfactant, one kind may be used alone, or two or more kinds may be used in combination.

As the fluorine surfactant, a compound described in paragraphs "0082" to "0090" of JP2014-119605A is preferable.

The addition amount of the surfactant in the liquid crystal composition is preferably 0.01 to 10 mass %, more preferably 0.01 to 5 mass %, and still more preferably 0.02 to 1 mass % with respect to the total mass of the liquid crystal compound.

——Chiral Agent (Optically Active Compound)——

The chiral agent has a function of causing a helical structure of a cholesteric liquid crystalline phase to be formed. The chiral agent may be selected depending on the purpose because a helical twisted direction or a helical pitch derived from the compound varies.

The chiral agent is not particularly limited, and a well-known compound (for example, Liquid Crystal Device Handbook (No. 142 Committee of Japan Society for the Promotion of Science, 1989), Chapter 3, Article 4-3, chiral agent for twisted nematic (TN) or super twisted nematic (STN), p. 199), isosorbide, or an isomannide derivative can be used.

In general, the chiral agent includes an asymmetric carbon atom. However, an axially asymmetric compound or a planar asymmetric compound not having an asymmetric carbon atom can also be used as the chiral agent. Examples of the axially asymmetric compound or the planar asymmetric compound include binaphthyl, helicene, paracyclophane, and derivatives thereof. The chiral agent may include a polymerizable group. In a case where both the chiral agent and the liquid crystal compound have a polymerizable group, a polymer which includes a repeating unit derived from the polymerizable liquid crystal compound and a repeating unit derived from the chiral agent can be formed due to a polymerization reaction of a polymerizable chiral agent and the polymerizable liquid crystal compound. In this aspect, it is preferable that the polymerizable group in the polymerizable chiral agent is the same as the polymerizable group in the polymerizable liquid crystal compound. Accordingly, the polymerizable group of the chiral agent is preferably an unsaturated polymerizable group, an epoxy group, or an aziridinyl group, more preferably an unsaturated polymerizable group, and still more preferably an ethylenically unsaturated polymerizable group.

In addition, the chiral agent may be a liquid crystal compound.

In a case where the chiral agent includes a photoisomerization group, a pattern having a desired reflection wavelength corresponding to an emission wavelength can be formed by irradiation of an actinic ray or the like through a photomask after coating and alignment, which is preferable. As the photoisomerization group, an isomerization portion of a photochromic compound, an azo group, an azoxy group, or a cinnamoyl group is preferable. Specific examples of the compound include compounds described in JP2002-080478A, JP2002-080851A, JP2002-179668A, JP2002-179669A, JP2002-179670A, JP2002-179681A, JP2002-179682A, JP2002-338575A, JP2002-338668A, JP2003-313189A, and JP2003-313292A.

——Photoreactive Chiral Agent——

The photoreactive chiral agent is formed of, for example, a compound represented by the following Formula (I) and has properties capable of controlling an aligned structure of the liquid crystal compound and changing a helical pitch of liquid crystal, that is, a helical twisting power (HTP) of a helical structure during light irradiation. That is, the photoreactive chiral agent is a compound that causes a helical twisting power of a helical structure derived from a liquid crystal compound, preferably, a nematic liquid crystal compound to change during light irradiation (ultraviolet light to visible light to infrared light), and includes a portion including a chiral portion and a portion in which a structural change occurs during light irradiation as necessary portions (molecular structural units). However, the photoreactive chiral agent represented by the following Formula (I) can significantly change the HTP of liquid crystal molecules.

The above-described HTP represents the helical twisting power of a helical structure of liquid crystal, that is, HTP=1/(Pitch×Chiral Agent Concentration [Mass Fraction]). For example, the HTP can be obtained by measuring a helical pitch (single period of the helical structure; μm) of a liquid crystal molecule at a given temperature and converting the measured value into a value [μm$^{-1}$] in terms of the concentration of the chiral agent. In a case where a selective reflection color is formed by the photoreactive chiral agent depending on the illuminance of light, a change ratio in HTP (HTP before irradiation/HTP after irradiation) is preferably 1.5 or higher and more preferably 2.5 or higher in a case where the HTP decreases after irradiation, and is preferably 0.7 or lower and more preferably 0.4 or lower in a case where the HTP increases after irradiation.

Next, the compound represented by Formula (I) will be described.

Formula (I)

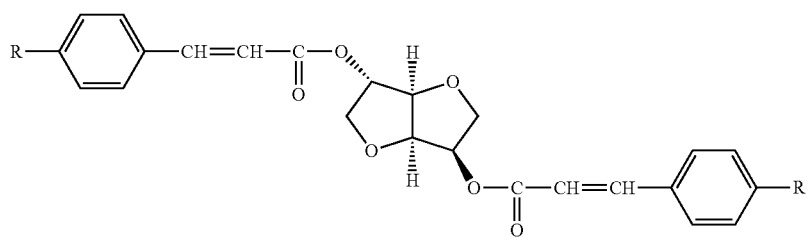

In the formula, R represents a hydrogen atom, an alkoxy group having 1 to 15 carbon atoms, an acryloyloxyalkyloxy group having 3 to 15 carbon atoms in total, or a methacryloyloxyalkyloxy group having 4 to 15 carbon atoms in total.

Examples of the alkoxy group having 1 to 15 carbon atoms include a methoxy group, an ethoxy group, a propoxy group, a butoxy group, a hexyloxy group, and a dodecyloxy group. In particular, an alkoxy group having 1 to 12 carbon atoms is preferable, and an alkoxy group having 1 to 8 carbon atoms is more preferable.

Examples of the acryloyloxyalkyloxy group having 3 to 15 carbon atoms in total include an acryloyloxyethyloxy group, an acryloyloxybutyloxy group, and an acryloyloxydecyloxy group. In particular, an acryloyloxyalkyloxy group having 5 to 13 carbon atoms is preferable, and an acryloyloxyalkyloxy group having 5 to 11 carbon atoms is more preferable.

Examples of the methacryloyloxyalkyloxy group having 4 to 15 carbon atoms in total include a methacryloyloxyethyloxy group, a methacryloyloxybutyloxy group, and a methacryloyloxydecyloxy group. In particular, a methacryloyloxyalkyloxy group having 6 to 14 carbon atoms is preferable, and a methacryloyloxyalkyloxy group having 6 to 12 carbon atoms is more preferable.

The molecular weight of the photoreactive chiral agent represented by Formula (I) is preferably 300 or higher. In addition, it is preferable that the solubility in the liquid crystal compound described below is high, and it is more preferable that the solubility parameter SP value is close to that of the liquid crystal compound.

Hereinafter, specific examples (exemplary compounds (1) to (15)) of the compound represented by Formula (I) will be shown, but the present invention is not limited thereto.

(1)

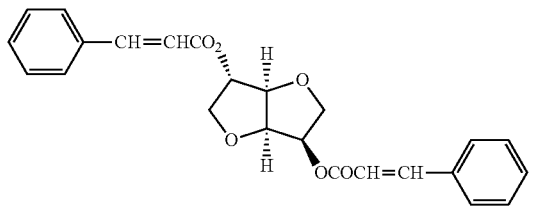

Right Twisted
Mw = 406.43

(2)

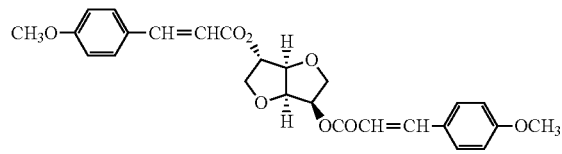

Right Twisted
Mw = 466.48

(3)

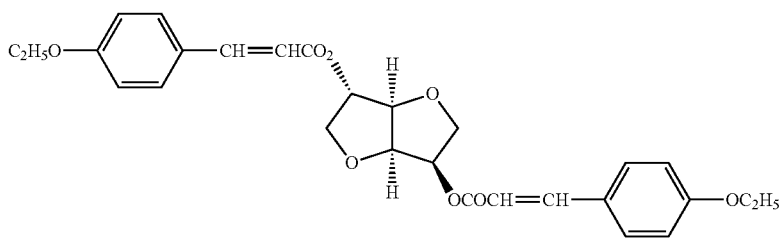

Right Twisted
Mw = 494.53

(4)

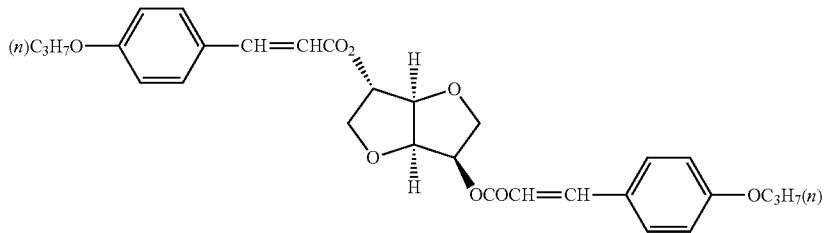

Right Twisted
Mw = 522.59

(5)

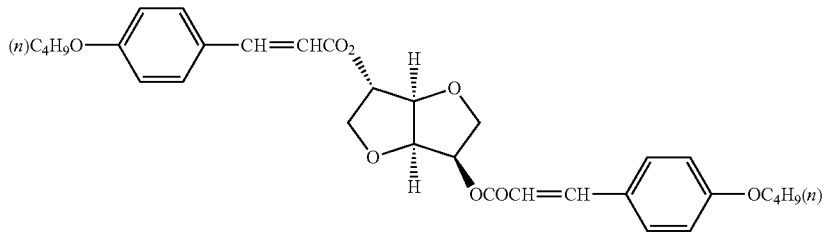

Right Twisted
Mw = 550.64

-continued
(6)
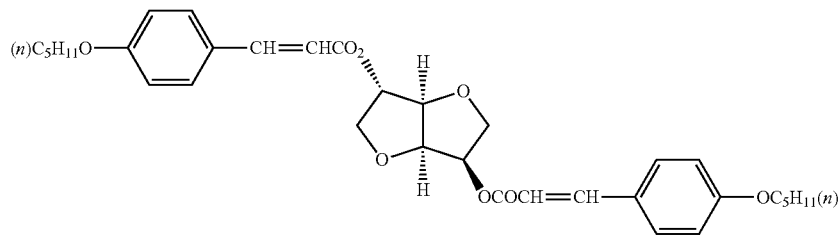
Right Twisted
Mw = 578.69
(7)
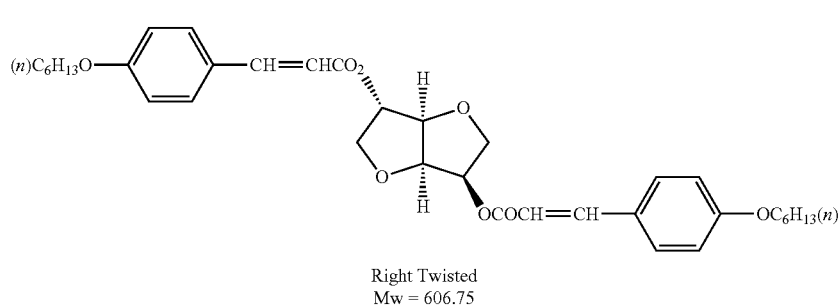
Right Twisted
Mw = 606.75
(8)
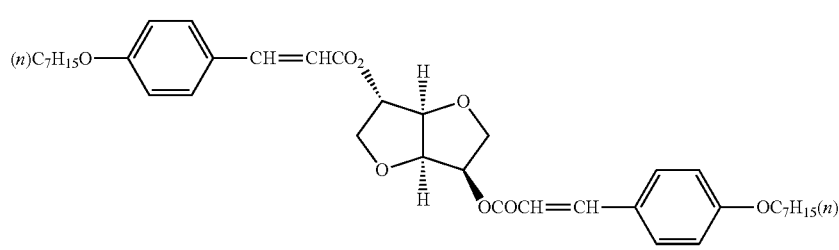
Right Twisted
Mw = 634.82
(9)
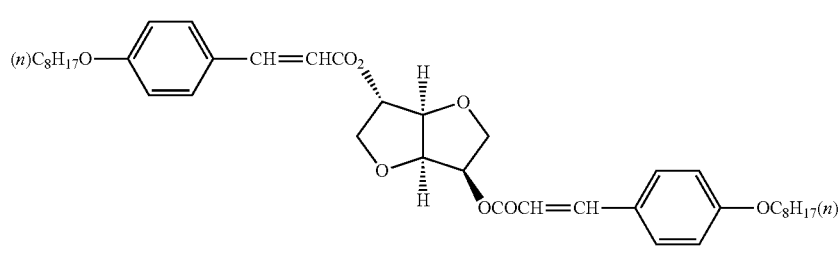
Right Twisted
Mw = 662.85
(10)
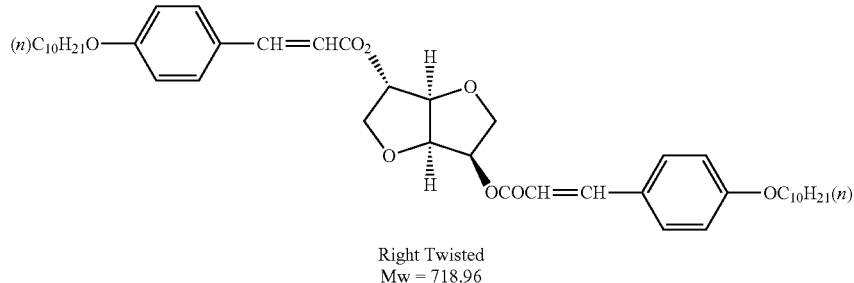
Right Twisted
Mw = 718.96

(11)
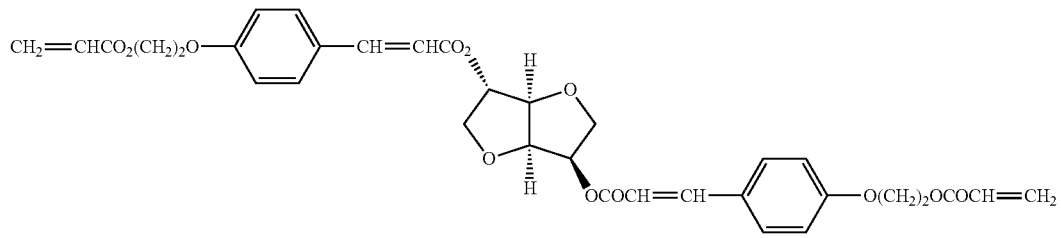
(12)
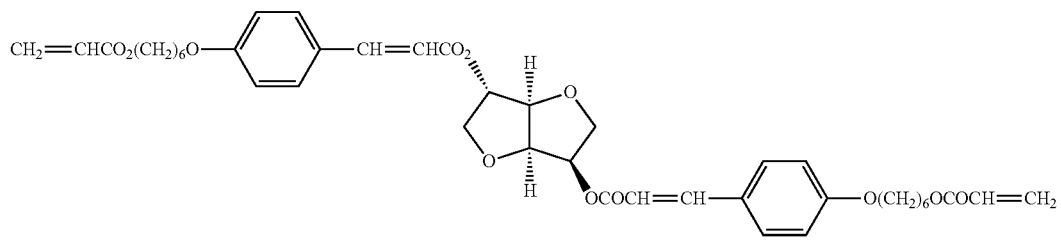
(13)
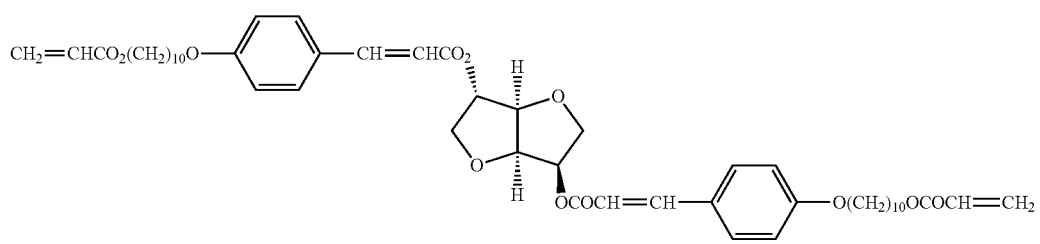
(14)
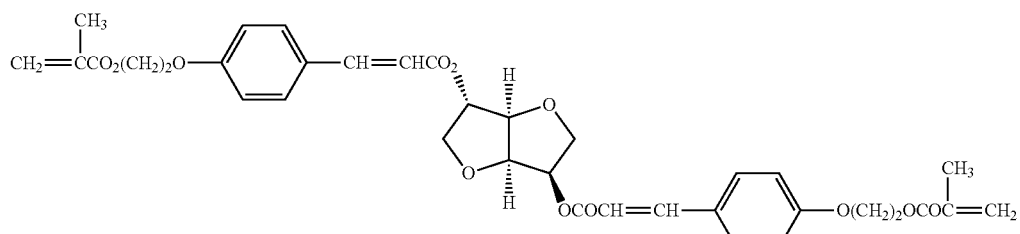
(15)
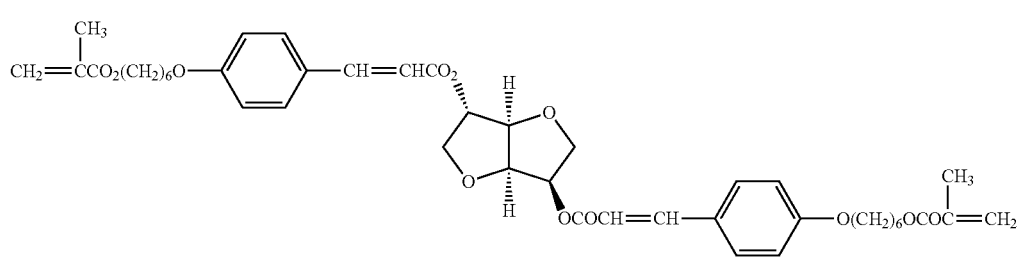
As the photoreactive optically active compound, for example, a compound represented by the following Formula (II) is also used.
Formula (II)
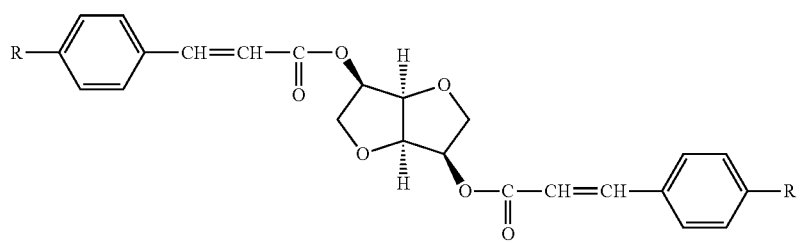

In the formula, R represents a hydrogen atom, an alkoxy group having 1 to 15 carbon atoms, an acryloyloxyalkyloxy group having 3 to 15 carbon atoms in total, or a methacryloyloxyalkyloxy group having 4 to 15 carbon atoms in total.

Examples of the alkoxy group having 1 to 15 carbon atoms include a methoxy group, an ethoxy group, a propoxy group, a butoxy group, a hexyloxy group, an octyloxy group, and a dodecyloxy group. In particular, an alkoxy group having 1 to 10 carbon atoms is preferable, and an alkoxy group having 1 to 8 carbon atoms is more preferable.

Examples of the acryloyloxyalkyloxy group having 3 to 15 carbon atoms in total include an acryloyloxy group, an acryloyloxyethyloxy group, an acryloyloxypropyloxy group, an acryloyloxyhexyloxy group, an acryloyloxybutyloxy group, and an acryloyloxydecyloxy group. In particular, an acryloyloxyalkyloxy group having 3 to 13 carbon atoms is preferable, and an acryloyloxyalkyloxy group having 3 to 11 carbon atoms is more preferable.

Examples of the methacryloyloxyalkyloxy group having 4 to 15 carbon atoms in total include a methacryloyloxy group, a methacryloyloxyethyloxy group, and a methacryloyloxyhexyloxy group. In particular, a methacryloyloxyalkyloxy group having 4 to 14 carbon atoms is preferable, and a methacryloyloxyalkyloxy group having 4 to 12 carbon atoms is more preferable.

The molecular weight of the photoreactive optically active compound represented by Formula (II) is preferably 300 or higher. In addition, it is preferable that the solubility in the liquid crystal compound described below is high, and it is more preferable that the solubility parameter SP value is close to that of the liquid crystal compound.

Hereinafter, specific examples (exemplary compounds (21) to (32)) of the photoreactive optically active compound represented by Formula (II) will be shown, but the present invention is not limited thereto.

(21)

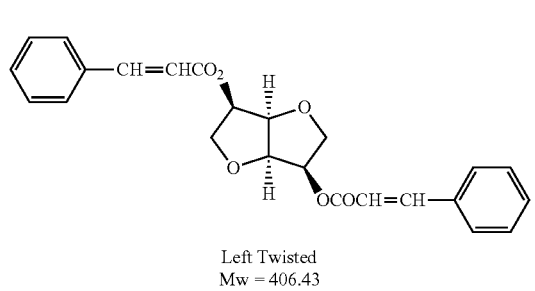

Left Twisted
Mw = 406.43

(22)

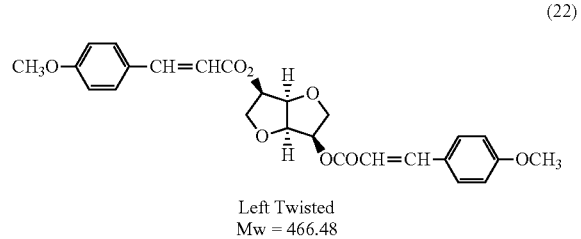

Left Twisted
Mw = 466.48

(23)

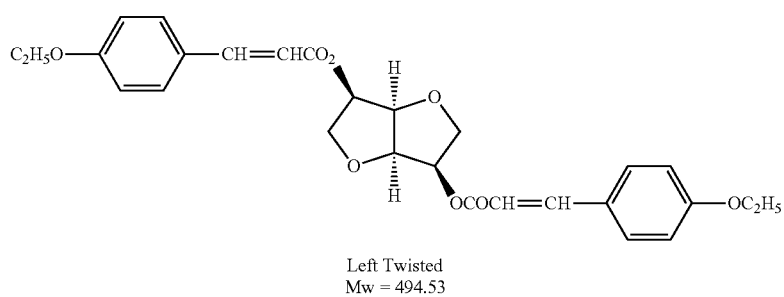

Left Twisted
Mw = 494.53

(24)

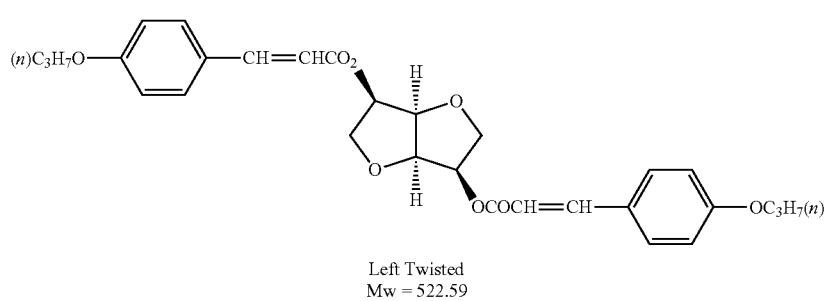

Left Twisted
Mw = 522.59

(25)

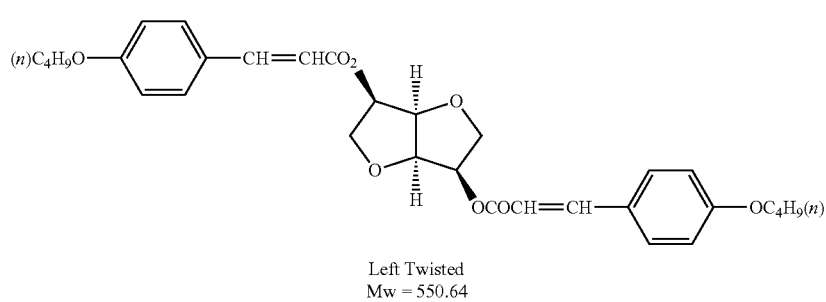

Left Twisted
Mw = 550.64

-continued
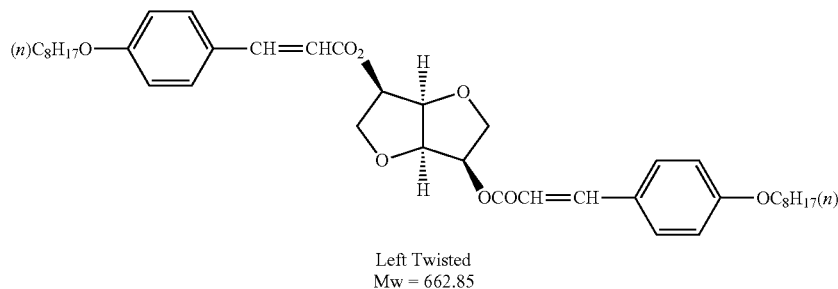
(26)
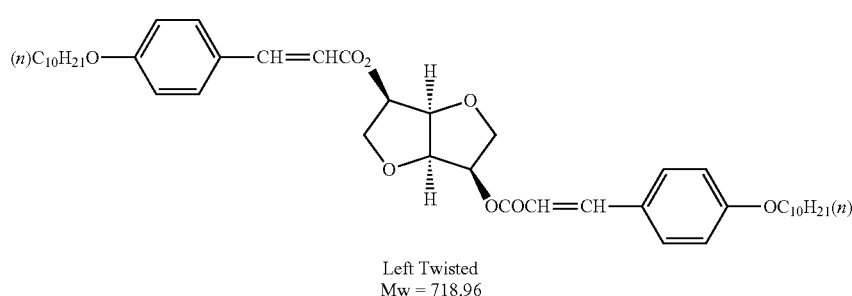
(27)
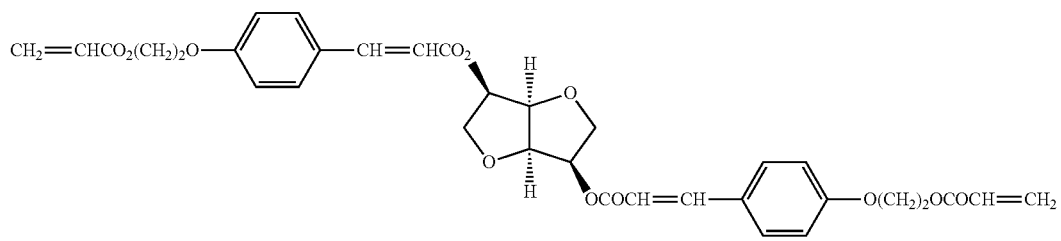
(28)
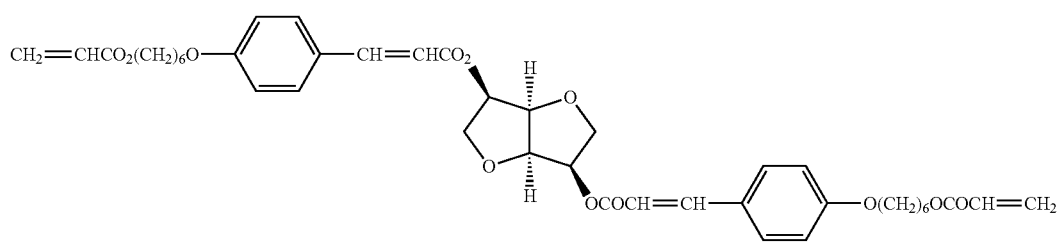
(29)
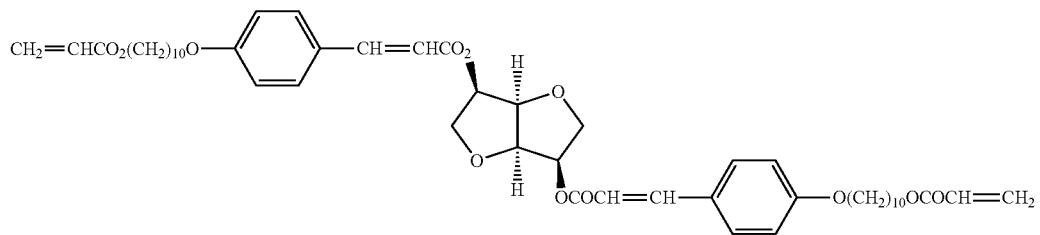
(30)
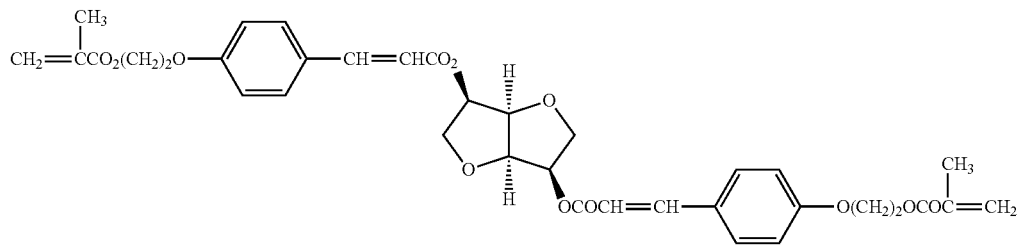
(31)

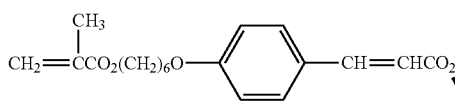
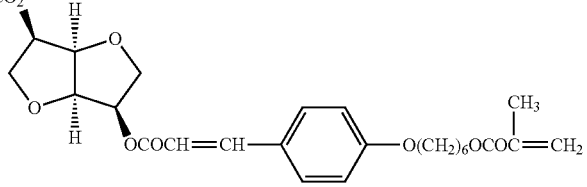

(32)

In addition, the photoreactive chiral agent can also be used in combination with a chiral agent having no photoreactivity such as a chiral compound having a large temperature dependence of the helical twisting power. Examples of the well-known chiral agent having no photoreactivity include chiral agents described in JP2000-044451A, JP1998-509726A (JP-H10-509726A), WO1998/000428A, JP2000-506873A, JP1997-506088A (JP-H09-506088A), Liquid Crystals (1996, 21, 327), and Liquid Crystals (1998, 24, 219).

The content of the chiral agent in the liquid crystal composition is preferably 0.01% to 200 mol % and more preferably 1% to 30 mol % with respect to the content molar amount of the liquid crystal compound.

——Polymerization Initiator——

In a case where the liquid crystal composition includes a polymerizable compound, it is preferable that the liquid crystal composition includes a polymerization initiator. In an aspect where a polymerization reaction progresses with ultraviolet irradiation, it is preferable that the polymerization initiator is a photopolymerization initiator which initiates a polymerization reaction with ultraviolet irradiation.

Examples of the photopolymerization initiator include an α-carbonyl compound (described in U.S. Pat. Nos. 2,367,661A and 2,367,670A), an acyloin ether (described in U.S. Pat. No. 2,448,828A), an α-hydrocarbon-substituted aromatic acyloin compound (described in U.S. Pat. No. 2,722,512A), a polynuclear quinone compound (described in U.S. Pat. Nos. 3,046,127A and 2,951,758A), a combination of a triarylimidazole dimer and p-aminophenyl ketone (described in U.S. Pat. No. 3,549,367A), an acridine compound and a phenazine compound (described in JP1985-105667A (JP-S60-105667A) and U.S. Pat. No. 4,239,850A), and an oxadiazole compound (described in U.S. Pat. No. 4,212,970A).

The content of the photopolymerization initiator in the liquid crystal composition is preferably 0.1 to 20 mass % and more preferably 0.5 to 12 mass % with respect to the content of the liquid crystal compound.

——Crosslinking Agent——

In order to improve the film hardness after curing and to improve durability, the liquid crystal composition may optionally include a crosslinking agent. As the crosslinking agent, a curing agent which can perform curing with ultraviolet light, heat, moisture, or the like can be suitably used.

The crosslinking agent is not particularly limited and can be appropriately selected depending on the purpose. Examples of the crosslinking agent include: a polyfunctional acrylate compound such as trimethylol propane tri(meth) acrylate or pentaerythritol tri(meth)acrylate; an epoxy compound such as glycidyl (meth)acrylate or ethylene glycol diglycidyl ether; an aziridine compound such as 2,2-bis hydroxymethyl butanol-tris[3-(1-aziridinyl)propionate] or 4,4-bis(ethyleneiminocarbonylamino)diphenylmethane; an isocyanate compound such as hexamethylene diisocyanate or a biuret type isocyanate; a polyoxazoline compound having an oxazoline group at a side chain thereof; and an alkoxysilane compound such as vinyl trimethoxysilane or N-(2-aminoethyl)-3-aminopropyltrimethoxysilane. In addition, depending on the reactivity of the crosslinking agent, a well-known catalyst can be used, and not only film hardness and durability but also productivity can be improved. Among these crosslinking agents, one kind may be used alone, or two or more kinds may be used in combination.

The content of the crosslinking agent is preferably 3% to 20 mass % and more preferably 5% to 15 mass % with respect to the solid content mass of the liquid crystal composition. In a case where the content of the crosslinking agent is in the above-described range, an effect of improving a crosslinking density can be easily obtained, and the stability of a cholesteric liquid crystalline phase is further improved.

——Other Additives——

Optionally, a polymerization inhibitor, an antioxidant, an ultraviolet absorber, a light stabilizer, a coloring material, metal oxide particles, or the like can be added to the liquid crystal composition in a range where optical performance and the like do not deteriorate.

It is preferable that the liquid crystal composition is used as a liquid during the formation of the optically-anisotropic layer.

The liquid crystal composition may include a solvent. The solvent is not particularly limited and can be appropriately selected depending on the purpose. An organic solvent is preferable.

The organic solvent is not particularly limited and can be appropriately selected depending on the purpose. Examples of the organic solvent include a ketone, an alkyl halide, an amide, a sulfoxide, a heterocyclic compound, a hydrocarbon, an ester, and an ether. Among these organic solvents, one kind may be used alone, or two or more kinds may be used in combination. Among these, a ketone is preferable in consideration of an environmental burden.

In a case where the optically-anisotropic layer is formed, it is preferable that the optically-anisotropic layer is formed by applying the liquid crystal composition to a surface where the optically-anisotropic layer is to be formed, aligning the liquid crystal compound to a state of a cholesteric liquid crystalline phase, and curing the liquid crystal compound.

That is, in a case where the optically-anisotropic layer is formed on the alignment film, it is preferable that the optically-anisotropic layer obtained by immobilizing a cholesteric liquid crystalline phase is formed by applying the liquid crystal composition to the alignment film, aligning the liquid crystal compound to a state of a cholesteric liquid crystalline phase, and curing the liquid crystal compound.

For the application of the liquid crystal composition, a printing method such as ink jet or scroll printing or a well-known method such as spin coating, bar coating, or spray coating capable of uniformly applying liquid to a sheet-shaped material can be used.

The applied liquid crystal composition is optionally dried and/or heated and then is cured to form the optically-anisotropic layer. In the drying and/or heating step, the liquid crystal compound in the liquid crystal composition only has to be aligned to a cholesteric liquid crystalline phase. In the case of heating, the heating temperature is preferably 200° C. or lower and more preferably 130° C. or lower.

The aligned liquid crystal compound is optionally further polymerized. Regarding the polymerization, thermal polymerization or photopolymerization using light irradiation may be performed, and photopolymerization is preferable. Regarding the light irradiation, ultraviolet light is preferably used. The irradiation energy is preferably 20 mJ/cm$^2$ to 50 J/cm$^2$ and more preferably 50 to 1500 mJ/cm$^2$. In order to promote a photopolymerization reaction, light irradiation may be performed under heating conditions or in a nitrogen atmosphere. The wavelength of irradiated ultraviolet light is preferably 250 to 430 nm.

The thickness of the optically-anisotropic layer is not particularly limited, and the thickness with which a required light reflectivity can be obtained may be appropriately set depending on the use of the liquid crystal diffraction element 10, the light reflectivity required for the optically-anisotropic layer, the material for forming the optically-anisotropic layer, and the like.

<<Liquid Crystal Alignment Pattern of Optically-Anisotropic Layer>>

As described above, in the liquid crystal diffraction element 10 according to the embodiment of the present invention, the optically-anisotropic layer has the liquid crystal alignment pattern in which the direction of the optical axis 30A derived from the liquid crystal compound 30 changes while continuously rotating in the one in-plane direction in a plane of the optically-anisotropic layer. In the example shown in FIG. 1, the optically-anisotropic layer has the liquid crystal alignment pattern in which the direction of the optical axis 30A derived from the liquid crystal compound 30 forming the cholesteric liquid crystalline phase changes while continuously rotating in the one in-plane direction in a plane of the optically-anisotropic layer.

The optical axis 30A derived from the liquid crystal compound 30 is an axis having the highest refractive index in the liquid crystal compound 30, that is, a so-called slow axis. For example, in a case where the liquid crystal compound 30 is a rod-shaped liquid crystal compound, the optical axis 30A is along a rod-shaped major axis direction. In the following description, the optical axis 30A derived from the liquid crystal compound 30 will also be referred to as "the optical axis 30A of the liquid crystal compound 30" or "the optical axis 30A".

FIG. 2 is a plan view conceptually showing the optically-anisotropic layer 18 shown in FIG. 1.

The plan view is a view in a case where the liquid crystal diffraction element 10 is seen from the top in FIG. 1, that is, a view in a case where the liquid crystal diffraction element 10 is seen from a thickness direction (laminating direction of the respective layers (films)).

In addition, in FIG. 2, in order to clarify the configuration of the optically-anisotropic layer 18, only the liquid crystal compound 30 on the surface of the alignment film 24 is shown.

As shown in FIG. 2, on the surface of the alignment film 24, the liquid crystal compound 30 forming the optically-anisotropic layer 18 is two-dimensionally arranged according to the alignment pattern formed on the alignment film 24 as the lower layer in a predetermined one in-plane direction indicated by arrow X and a direction perpendicular to the one in-plane direction (arrow X direction).

In the following description, the direction perpendicular to the arrow X direction will be referred to as "Y direction" for convenience of description. That is, in FIGS. 1 and 4 and FIGS. 7, 9, and 10 described below, the Y direction is a direction perpendicular to the paper plane.

In addition, the liquid crystal compound 30 forming the optically-anisotropic layer 18 has the liquid crystal alignment pattern in which the direction of the optical axis 30A changes while continuously rotating in the arrow X direction in a plane of the optically-anisotropic layer 18. In the example shown in FIGS. 1 and 2, the liquid crystal compound 30 has the liquid crystal alignment pattern in which the optical axis 30A of the liquid crystal compound 30 changes while continuously rotating clockwise in the arrow X direction.

Specifically, "the direction of the optical axis 30A of the liquid crystal compound 30 changes while continuously rotating in the arrow X direction (the predetermined one in-plane direction)" represents that an angle between the optical axis 30A of the liquid crystal compound 30, which is arranged in the arrow X direction, and the arrow X direction varies depending on positions in the arrow X direction, and the angle between the optical axis 30A and the arrow X direction sequentially changes from θ to θ+180° or θ-180° in the arrow X direction.

A difference between the angles of the optical axes 30A of the liquid crystal compound 30 adjacent to each other in the arrow X direction is preferably 45° or less, more preferably 15° or less, and still more preferably less than 15°.

On the other hand, in the liquid crystal compound 30 forming the optically-anisotropic layer 18, the directions of the optical axes 30A are the same in the Y direction perpendicular to the arrow X direction, that is, the Y direction perpendicular to the one in-plane direction in which the optical axis 30A continuously rotates.

In other words, in the liquid crystal compound 30 forming the optically-anisotropic layer 18, angles between the optical axes 30A of the liquid crystal compound 30 and the arrow X direction are the same in the Y direction.

In the liquid crystal diffraction element 10 according to the embodiment of the present invention, in the liquid crystal alignment pattern of the liquid crystal compound 30, the length (distance) over which the optical axis 30A of the liquid crystal compound 30 rotates by 180° in the arrow X direction in which the optical axis 30A changes while continuously rotating in a plane is the length Λ of the single period in the liquid crystal alignment pattern.

That is, a distance between centers of two liquid crystal compounds 30 in the arrow X direction is the length Λ of the single period, the two liquid crystal compounds having the same angle in the arrow X direction. Specifically, as shown in FIG. 2, a distance of centers in the arrow X direction of two liquid crystal compounds 30 in which the arrow X direction and the direction of the optical axis 30A match each other is the length Λ of the single period.

In the following description, the length Λ of the single period will also be referred to as "single period Λ".

In the liquid crystal diffraction element 10 according to the embodiment of the present invention, in the liquid crystal alignment pattern of the optically-anisotropic layer, the single period Λ is repeated in the arrow X direction, that is, in the one in-plane direction in which the direction of the optical axis 30A changes while continuously rotating.

The optically-anisotropic layer obtained by immobilizing a cholesteric liquid crystalline phase typically reflects incident light (circularly polarized light) by specular reflection.

On the other hand, the optically-anisotropic layer 18 having the above-described liquid crystal alignment pattern reflects incidence light in a direction having an angle in the arrow X direction with respect to specular reflection. For example, in the optically-anisotropic layer 18, light incident from the normal direction is reflected in a state where it is tilted as indicated by the arrow X with respect to the normal direction instead of being reflected in the normal direction. That is, the light incident from the normal direction refers to light incident from the front side that is light incident to be perpendicular to a main surface. The main surface refers to the maximum surface of a sheet-shaped material.

Figure 4:
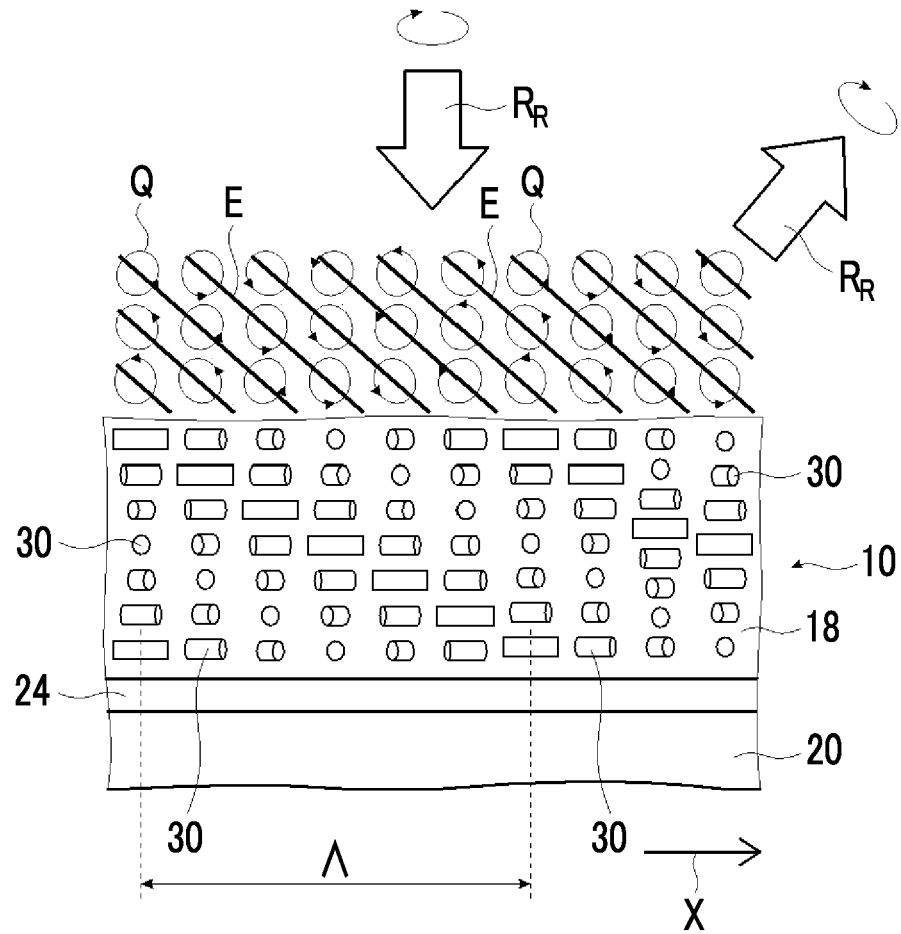
FIG. 4 is a diagram showing an action of the optically-anisotropic layer of FIG. 1.

Hereinafter, the description will be made with reference to FIG. 4.

As described above, the optically-anisotropic layer 18 selectively reflects one circularly polarized light of the selective reflection wavelength. For example, in consideration of the configuration where the selective reflection wavelength of the optically-anisotropic layer 18 is red light and the optically-anisotropic layer 18 reflects right circularly polarized light, in a case where light $R_R$ is incident into the optically-anisotropic layer 18, the optically-anisotropic layer 18 reflects only right circularly polarized light $R_R$ of red light and allows transmission of the other light.

In a case where the right circularly polarized light $R_R$ of red light incident into the optically-anisotropic layer 18 is reflected from the optically-anisotropic layer 18, the absolute phase changes depending on the directions of the optical axes 30A of the respective liquid crystal compounds 30.

Here, in the optically-anisotropic layer 18, the optical axis 30A of the liquid crystal compound 30 changes while rotating in the arrow X direction (one in-plane direction). Therefore, the amount of change in the absolute phase of the incident right circularly polarized light $R_R$ of red light varies depending on the directions of the optical axes 30A.

Further, the liquid crystal alignment pattern that is formed in the optically-anisotropic layer 18 is a pattern that is periodic in the arrow X direction. Therefore, as conceptually shown in FIG. 4, an absolute phase Q that is periodic in the arrow X direction corresponding to the direction of the optical axis 30A is assigned to the right circularly polarized light $R_R$ of red light incident into the optically-anisotropic layer 18.

In addition, the direction of the optical axis 30A of the liquid crystal compound 30 with respect to the arrow X direction is uniform in the arrangement of the liquid crystal compound 30 in the Y direction perpendicular to the arrow X direction.

As a result, in the optically-anisotropic layer 18, an equiphase surface E that is tilted in the arrow X direction with respect to an XY plane is formed for the right circularly polarized light $R_R$ of red light.

Therefore, the right circularly polarized light $R_R$ of red light is reflected in the normal direction of the equiphase surface E (direction perpendicular to the equiphase surface E), and the reflected right circularly polarized light $R_R$ of red light is reflected in a direction that is tilted in the arrow X direction with respect to the XY plane (main surface of the optically-anisotropic layer 18).

Here, a reflection angle of light from the optically-anisotropic layer in which the optical axis 30A of the liquid crystal compound 30 continuously rotates in the one in-plane direction (arrow X direction) varies depending on wavelengths of light to be reflected. Specifically, as the wavelength of light increases, the angle of reflected light with respect to incidence light increases.

In addition, a reflection angle of light from the optically-anisotropic layer in which the optical axis 30A of the liquid crystal compound 30 continuously rotates in the arrow X direction (one in-plane direction) varies depending on the length Λ of the single period of the liquid crystal alignment pattern over which the optical axis 30A rotates by 180° in the arrow X direction, that is, depending on the single period Λ. Specifically, as the length of the single period Λ decreases, the angle of reflected light with respect to incidence light increases.

In the liquid crystal diffraction element 10 according to the embodiment of the present invention, the single period Λ in the alignment pattern of the optically-anisotropic layer is not particularly limited and may be appropriately set depending on the use of the liquid crystal diffraction element 10 and the like.

Here, the liquid crystal diffraction element 10 according to the embodiment of the present invention can be suitably used as, for example, a diffraction element that reflects light propagated in a light guide plate in AR glasses to be emitted to an observation position by a user from the light guide plate.

In this case, in order to reliably emit light propagated in the light guide plate, it is necessary to reflect at a large angle to some degree with respect to incidence light.

In addition, as described above, regarding the reflection angle of light from the optically-anisotropic layer, the reflection angle with respect to incidence light can be increased by reducing the single period Λ in the liquid crystal alignment pattern.

In consideration of this point, the single period Λ in the liquid crystal alignment pattern of the optically-anisotropic layer is preferably 50 μm or less and more preferably 10 μm or less.

In consideration of the accuracy of the liquid crystal alignment pattern and the like, the single period Λ in the liquid crystal alignment pattern of the optically-anisotropic layer is preferably 0.1 μm or more.

Here, in the liquid crystal diffraction element according to the embodiment of the present invention, the optically-anisotropic layer has a configuration in which a diffraction efficiency increases from one side to another side in the one in-plane direction in which the direction of the optical axis derived from the liquid crystal compound rotates in a plane (hereinafter, referred to as "the one in-plane direction in which the optical axis rotates").

For example, in the case of the optically-anisotropic layer shown in FIGS. 1 and 2, a diffraction efficiency increases from one side to another side in the X direction.

Figure 5:
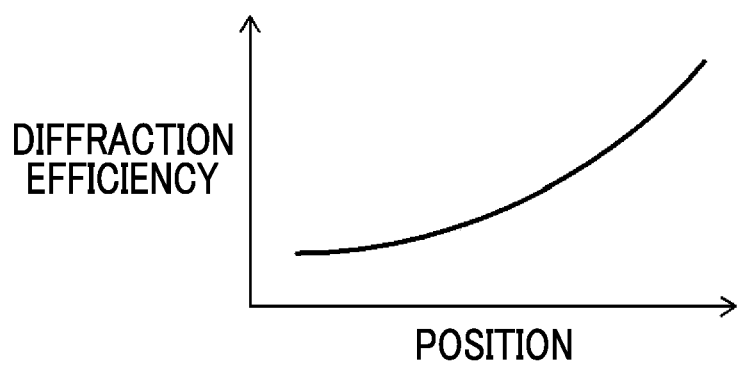
FIG. 5 is a graph conceptually showing an example of a relationship between a position and a diffraction efficiency of the optically-anisotropic layer.
Figure 6:
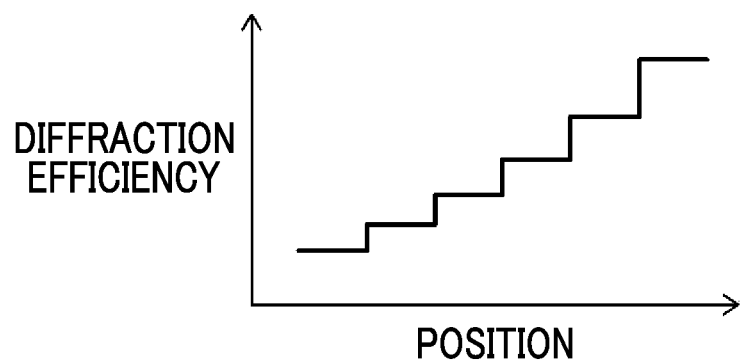
FIG. 6 is a graph conceptually showing another example of the relationship between a position and a diffraction efficiency of the optically-anisotropic layer.

Each of FIGS. 5 and 6 is a schematic graph showing a relationship between a position of the optically-anisotropic layer 18 in the one in-plane direction (X direction) in which the optical axis rotates and a diffraction efficiency at this position.

In the X direction, the diffraction efficiency of the optically-anisotropic layer 18 may be configured to continuously change as shown in FIG. 5 or may be configured to change stepwise as shown in FIG. 6.

Figure 24:
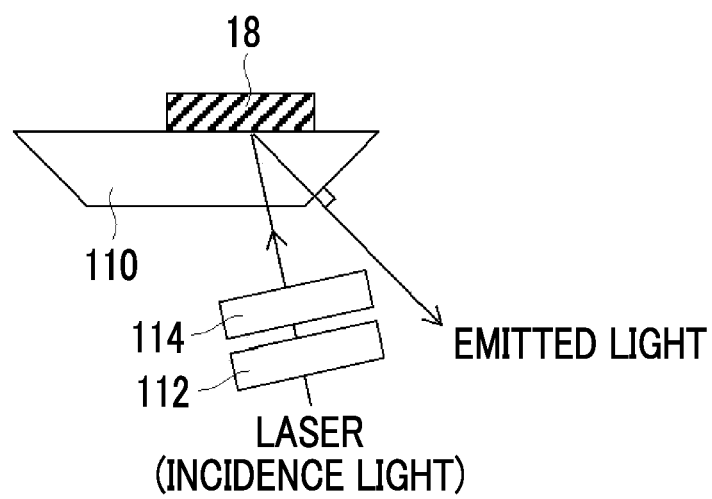
FIG. 24 is a schematic diagram showing a method of measuring an diffraction efficiency.

Here, regarding the diffraction efficiency, the optically-anisotropic layer 18 is transferred to a dove prism 110 (refractive index=1.517, slope angle=45°) as shown in FIG. 24, laser light having a predetermined wavelength is caused to transmit through a linear polarizer 112 and a λ/4 plate 114 to be converted into right circularly polarized light, and the right circularly polarized light is caused to be incident into the surface of the optically-anisotropic layer 18 with an angle that is set such that diffracted light is emitted vertically from the slope. An emitted light intensity Lr is measured using a Power Meter 1918-C (manufactured by Newport Corporation), and a ratio (Lr/Li×100 [%]) of the emitted light intensity Lr to an incidence light intensity Li is obtained as a diffraction efficiency.

In the liquid crystal diffraction element according to the embodiment of the present invention, the optically-anisotropic layer has a configuration in which a diffraction efficiency increases from one side to another side in the one in-plane direction in which the optical axis derived from the liquid crystal compound rotates. Therefore, in a light guide element used in an AR display device or the like of augmented reality (AR) glasses or the like, in a case where the liquid crystal diffraction element according to the embodiment of the present invention is used as a diffraction element that diffracts light propagated in a light guide plate to be emitted from the light guide plate, even in a case where exit pupil expansion is performed, the brightness (light amount) of light emitted from the light guide plate can be made uniform.

This point will be described below.

In a case where a direction in which regions in which the diffraction efficiency is constant are arranged in the optically-anisotropic layer is a change direction of the diffraction efficiency, the change direction of the diffraction efficiency may be the same as or different from the one in-plane direction in which the optical axis rotates. That is, the change direction of the diffraction efficiency may intersect the one in-plane direction in which the optical axis rotates. Even in the configuration in which the change direction of the diffraction efficiency intersects the one in-plane direction in which the optical axis rotates, the diffraction efficiency increases from one side to another side in the one in-plane direction in which the optical axis rotates.

The configuration in which the diffraction efficiency of the optically-anisotropic layer increases from one side to another side in the one in-plane direction in which the direction of the optical axis derived from the liquid crystal compound rotates in a plane can be realized by the optically-anisotropic layer having any one of the following configuration (i) or (ii).

(i) A configuration in which the thickness increases from one side to another side in the one in-plane direction in which the optical axis rotates.

(ii) A configuration in which a thickness-direction retardation Rth increases from one side to another side in the one in-plane direction in which the optical axis rotates.

In the optically-anisotropic layer, the diffraction efficiency increases in a region having a large thickness and decreases in a region having a small thickness. Therefore, by the optically-anisotropic layer adopting the configuration in which the thickness increases from one side to another side in the one in-plane direction in which the optical axis rotates, the diffraction efficiency can be changed.

As described above, in the optically-anisotropic layer, the liquid crystal compound is arranged in the desired alignment pattern. In a region where this arrangement is not disordered, light can be appropriately diffracted. Therefore, the diffraction efficiency increases. In addition, in a region where the arrangement of the liquid crystal compound is not disordered, the thickness-direction retardation Rth increases.

On the other hand, in a region where this arrangement of the liquid crystal compound is disordered, light is not likely to be appropriately diffracted. Therefore, the diffraction efficiency decreases. In addition, in a region where the arrangement of the liquid crystal compound is disordered, the thickness-direction retardation Rth decreases.

Accordingly, by the optically-anisotropic layer adopting the configuration in which the thickness-direction retardation Rth increases from one side to another side in the one in-plane direction in which the optical axis rotates, the diffraction efficiency can be changed.

A method of forming the optically-anisotropic layer will be described below in detail.

Second Embodiment

Here, in the example shown in FIG. 1, in the optically-anisotropic layer, the liquid crystal compound is cholesterically aligned, but the present invention is not limited thereto. The liquid crystal compound may not be cholesterically aligned.

Figure 7:
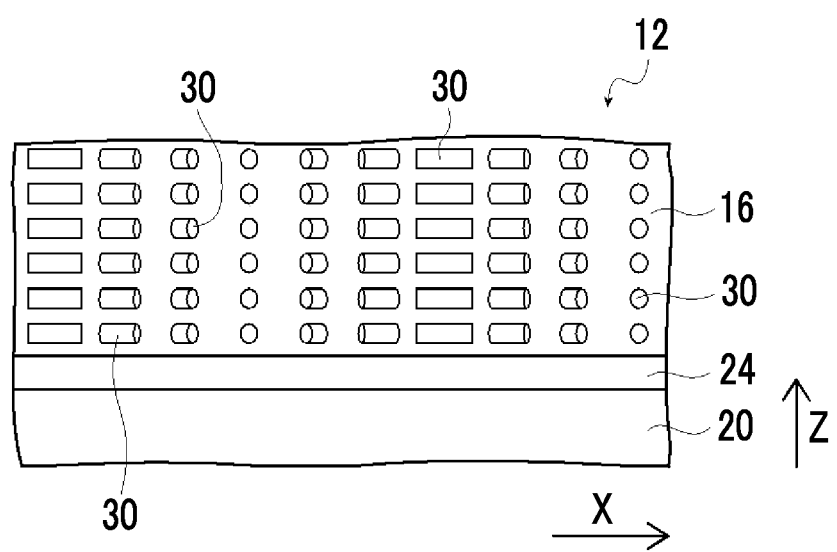
FIG. 7 is a conceptual diagram showing an example of a second embodiment of the liquid crystal diffraction element according to the present invention.

FIG. 7 conceptually shows a second embodiment of the liquid crystal diffraction element according to the present invention.

A liquid crystal diffraction element 12 shown in FIG. 7 diffracts incident light and allows transmission thereof.

The liquid crystal diffraction element 12 shown in FIG. 7 has a configuration in which the support 20, the alignment film 24, and an optically-anisotropic layer 16 are laminated in this order.

Since the support 20 and the alignment film 24 have the same configuration as the support 20 and the alignment film 24 of the liquid crystal diffraction element 10 shown in FIG. 1, the description thereof will not be made.

<Optically-Anisotropic Layer>

The optically-anisotropic layer 16 is formed on a surface of the alignment film 24.

The optically-anisotropic layer 18 is a layer that is formed of a composition including a liquid crystal compound, and has a liquid crystal alignment pattern in which a direction of an optical axis derived from the liquid crystal compound continuously rotates in at least one in-plane direction.

Figure 8:
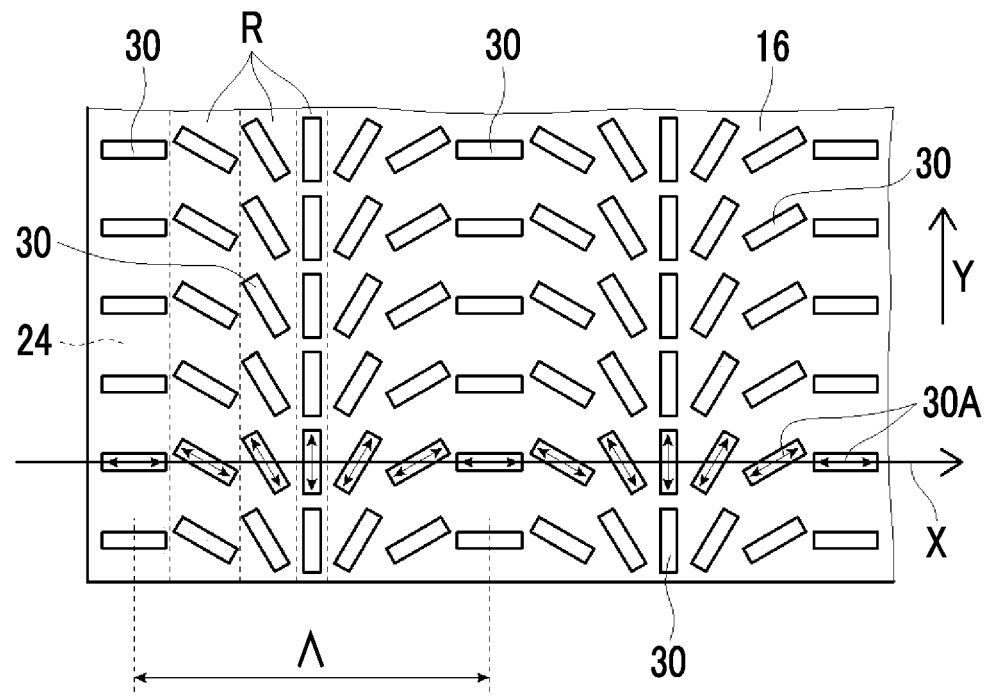
FIG. 8 is a top view showing an optically-anisotropic layer of FIG. 7.

FIG. 8 is a plan view showing the liquid crystal diffraction element shown in FIG. 7. The plan view is a view in a case where the liquid crystal diffraction element is seen from the top in FIG. 7, that is, a view in a case where the liquid crystal diffraction element is seen from a thickness direction (laminating direction of the respective layers (films)). In other words, the plan view is a view in a case where the optically-anisotropic layer is seen from a direction perpendicular to a main surface.

In addition, in FIG. 8, in order to clarify the configuration of the liquid crystal diffraction element, only the liquid crystal compound 30 on the surface of the alignment film 24 is shown as the liquid crystal compound 30 in the optically-anisotropic layer. However, in the thickness direction, as shown in FIG. 7, the optically-anisotropic layer has the structure in which the liquid crystal compound 30 is laminated on the liquid crystal compound 30 of the surface of the alignment film 24.

As shown in FIG. 8, the optically-anisotropic layer 16 has the liquid crystal alignment pattern in which the direction of the optical axis 30A derived from the liquid crystal compound 30 changes while continuously rotating in the one in-plane direction indicated by arrow X in a plane of the optically-anisotropic layer.

Specifically, "the direction of the optical axis 30A of the liquid crystal compound 30 changes while continuously rotating in the arrow X direction (the predetermined one in-plane direction)" represents that an angle between the optical axis 30A of the liquid crystal compound 30, which is arranged in the arrow X direction, and the arrow X direction varies depending on positions in the arrow X direction, and the angle between the optical axis 30A and the arrow X direction sequentially changes from θ to θ+180° or θ−180° in the arrow X direction.

A difference between the angles of the optical axes 30A of the liquid crystal compound 30 adjacent to each other in the arrow X direction is preferably 45° or less, more preferably 15° or less, and still more preferably less than 15°.

On the other hand, regarding the liquid crystal compound 30 forming the optically-anisotropic layer, the liquid crystal compounds 30 having the same direction of the optical axes 30A are arranged at regular intervals in the Y direction perpendicular to the arrow X direction, that is, the Y direction perpendicular to the one in-plane direction in which the optical axis 30A continuously rotates.

In other words, regarding the liquid crystal compound 30 forming the optically-anisotropic layer, in the liquid crystal compounds 30 arranged in the Y direction, angles between the directions of the optical axes 30A and the arrow X direction are the same.

In the liquid crystal alignment pattern of the optically-anisotropic layer 16, the length Λ of the single period is repeated in the arrow X direction, that is, in the one in-plane direction in which the direction of the optical axis 30A changes while continuously rotating.

As described above, in the liquid crystal compounds arranged in the Y direction in the optically-anisotropic layer 16, the angles between the optical axes 30A and the arrow X direction (the one in-plane direction in which the direction of the optical axis of the liquid crystal compound 30 rotates) are the same. Regions where the liquid crystal compounds 30 in which the angles between the optical axes 30A and the arrow X direction are the same are disposed in the Y direction will be referred to as "regions R".

In this case, it is preferable that an in-plane retardation (Re) value of each of the regions R is a half wavelength, that is, λ/2. The in-plane retardation is calculated from the product of a difference Δn in refractive index generated by refractive index anisotropy of the region R and the thickness of the optically-anisotropic layer 16. Here, the difference in refractive index generated by refractive index anisotropy of the region R in the optically-anisotropic layer 16 is defined by a difference between a refractive index of a direction of an in-plane slow axis of the region R and a refractive index of a direction perpendicular to the direction of the slow axis. That is, the difference Δn in refractive index generated by refractive index anisotropy of the region R is the same as a difference between a refractive index of the liquid crystal compound 30 in the direction of the optical axis 30A and a refractive index of the liquid crystal compound 30 in a direction perpendicular to the optical axis 30A in a plane of the region R. That is, the difference Δn in refractive index is the same as the difference in refractive index of the liquid crystal compound.

In a case where circularly polarized light is incident into the above-described optically-anisotropic layer 16, the light is refracted such that the direction of the circularly polarized light is converted.

Figure 9:
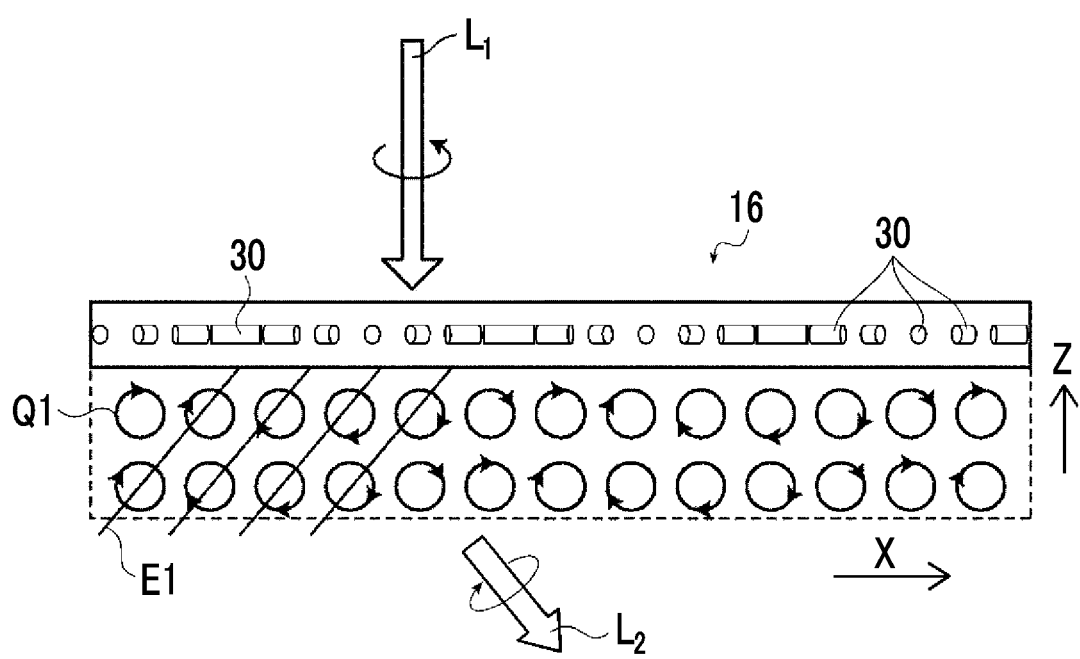
FIG. 9 is a diagram showing an action of the optically-anisotropic layer of FIG. 7.

This action is conceptually shown in FIG. 9 using the optically-anisotropic layer 16 as an example. In the optically-anisotropic layer 16, the value of the product of the difference in refractive index of the liquid crystal compound 30 and the thickness of the optically-anisotropic layer 16 is λ/2.

As shown in FIG. 9, in a case where the value of the product of the difference in refractive index of the liquid crystal compound 30 in the optically-anisotropic layer 16 and the thickness of the optically-anisotropic layer 16 is λ/2 and incidence light $L_1$ as left circularly polarized light is incident into the optically-anisotropic layer 16, the incidence light $L_1$ transmits through the optically-anisotropic layer 16 to be imparted with a phase difference of 180°, and the transmitted light $L_2$ is converted into right circularly polarized light.

In addition, in a case where the incidence light $L_1$ transmits through the optically-anisotropic layer 16, an absolute phase thereof changes depending on the direction of the optical axis 30A of each of the liquid crystal compounds 30. In this case, the direction of the optical axis 30A changes while rotating in the arrow X direction. Therefore, the amount of change in the absolute phase of the incidence light $L_1$ varies depending on the direction of the optical axis 30A. Further, the liquid crystal alignment pattern that is formed in the optically-anisotropic layer 16 is a pattern that is periodic in the arrow X direction. Therefore, as shown in FIG. 9, the incidence light $L_1$ transmitted through the optically-anisotropic layer 16 is imparted with an absolute phase Q1 that is periodic in the arrow X direction corresponding to the direction of each of the optical axes 30A. As a result, an equiphase surface E1 that is tilted in a direction opposite to the arrow X direction is formed.

Therefore, the transmitted light $L_2$ is refracted to be tilted in a direction perpendicular to the equiphase surface E1 and travels in a direction different from a traveling direction of the incidence light $L_1$. This way, the incidence light $L_1$ of the left circularly polarized light is converted into the transmitted light $L_2$ of right circularly polarized light that is tilted by a predetermined angle in the arrow X direction with respect to an incidence direction.

Figure 10:
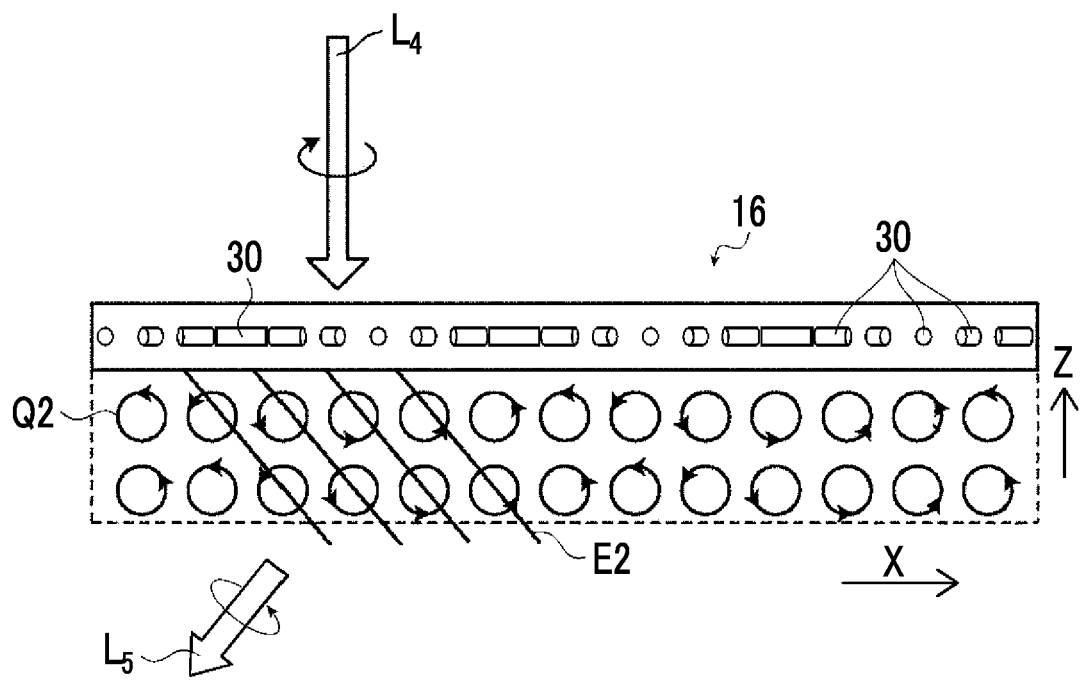
FIG. 10 is a diagram showing an action of the optically-anisotropic layer of FIG. 7.

On the other hand, as conceptually shown in FIG. 10, in a case where the value of the product of the difference in refractive index of the liquid crystal compound 30 in the optically-anisotropic layer 16 and the thickness of the optically-anisotropic layer 16 is λ/2 and incidence light $L_4$ as right circularly polarized light is incident into the optically-anisotropic layer 16, the incidence light $L_4$ transmits through the optically-anisotropic layer 16 to be imparted with a phase difference of 180° and is converted into transmitted light $L_5$ of left circularly polarized light.

In addition, in a case where the incidence light $L_4$ transmits through the optically-anisotropic layer 16, an absolute phase thereof changes depending on the direction of the optical axis 30A of each of the liquid crystal compounds 30. In this case, the direction of the optical axis 30A changes while rotating in the arrow X direction. Therefore, the amount of change in the absolute phase of the incidence light $L_4$ varies depending on the direction of the optical axis 30A. Further, the liquid crystal alignment pattern that is formed in the optically-anisotropic layer 16 is a pattern that is periodic in the arrow X direction. Therefore, as shown in FIG. 10, the incidence light $L_4$ transmitted through the optically-anisotropic layer 16 is imparted with an absolute phase Q2 that is periodic in the arrow X direction corresponding to the direction of each of the optical axes 30A.

Here, the incidence light $L_4$ is right circularly polarized light. Therefore, the absolute phase Q2 that is periodic in the arrow X direction corresponding to the direction of the optical axis 30A is opposite to the incidence light $L_1$ as left circularly polarized light. As a result, in the incidence light $L_4$, an equiphase surface E2 that is tilted in the arrow X direction opposite to that of the incidence light $L_1$ is formed.

Therefore, the incidence light $L_4$ is refracted to be tilted in a direction perpendicular to the equiphase surface E2 and travels in a direction different from a traveling direction of the incidence light $L_4$. This way, the incidence light $L_4$ is converted into the transmitted light $L_5$ of left circularly polarized light that is tilted by a predetermined angle in a direction opposite to the arrow X direction with respect to an incidence direction.

In the optically-anisotropic layer 16, it is preferable that the in-plane retardation value of the plurality of regions R is a half wavelength. It is preferable that an in-plane retardation Re(550)=$\Delta n_{550} \times d$ of the plurality of regions R of the optically-anisotropic layer 16 with respect to the incidence light having a wavelength of 550 nm is in a range defined by the following Expression (1). Here, $\Delta n_{550}$ represents a difference in refractive index generated by refractive index anisotropy of the region R in a case where the wavelength of incidence light is 550 nm, and d represents the thickness of the optically-anisotropic layer 16.

$$200 \text{ nm} \leq \Delta n_{550} \times d \leq 350 \text{ nm} \quad (1).$$

That is, in a case where the in-plane retardation Re(550)= $\Delta n_{550} \times d$ of the plurality of regions R of the optically-anisotropic layer 16 satisfies Expression (1), a sufficient amount of a circularly polarized light component in light incident into the optically-anisotropic layer 16 can be converted into circularly polarized light that travels in a direction tilted in a forward direction or reverse direction with respect to the arrow X direction. It is more preferable that the in-plane retardation Re(550)=$\Delta n_{550} \times d$ satisfies 225 nm≤$\Delta n_{550} \times d$≤340 nm, and it is still more preferable that the in-plane retardation Re(550)=$\Delta n_{550} \times d$ satisfies 250 nm≤$\Delta n_{550} \times d$≤330 nm.

Expression (1) is a range with respect to incidence light having a wavelength of 550 nm. However, an in-plane retardation Re(?)=$\Delta n_\lambda \times d$ of the plurality of regions R of the optically-anisotropic layer 16 with respect to incidence light having a wavelength of ? nm is preferably in a range defined by the following Expression (1-2) and can be appropriately set.

$$0.35 \times \lambda \text{ nm} \leq \Delta n_\lambda \times d \leq 0.65 \times \lambda \text{ nm} \quad (1-2)$$

In addition, the value of the in-plane retardation of the plurality of regions R of the optically-anisotropic layer 16 in a range outside the range of Expression (1) can also be used. Specifically, by satisfying $\Delta n_{550} \times d$<200 nm or 350 nm<$\Delta n_{550} \times d$, the light can be classified into light that travels in the same direction as a traveling direction of the incidence light and light that travels in a direction different from a traveling direction of the incidence light. In a case where $\Delta n_{550} \times d$ approaches 0 nm or 550 nm, the amount of the light component that travels in the same direction as a traveling direction of the incidence light increases, and the amount of the light component that travels in a direction different from a traveling direction of the incidence light decreases.

Further, it is preferable that an in-plane retardation Re(450)=$\Delta n_{550} \times d$ of each of the plurality of regions R of the optically-anisotropic layer 16 with respect to incidence light having a wavelength of 450 nm and an in-plane retardation Re(550)=$\Delta n_{550} \times d$ of each of the plurality of regions R of the optically-anisotropic layer 16 with respect to incidence light having a wavelength of 550 nm satisfy the following Expression (2). Here, $\Delta n_{550}$ represents a difference in refractive index generated by refractive index anisotropy of the region R in a case where the wavelength of incidence light is 450 nm.

$$(\Delta n_{450} \times d)/(\Delta n_{550} \times d) < 1.0 \quad (2)$$

Expression (2) represents that the liquid crystal compound 30 in the optically-anisotropic layer 16 has reverse dispersion properties. That is, by satisfying Expression (2), the optically-anisotropic layer 16 can correspond to incidence light having a wide range of wavelength.

Here, by changing the single period Λ of the liquid crystal alignment pattern formed in the optically-anisotropic layer 16, refraction angles of the transmitted light components $L_2$ and $L_5$ can be adjusted. Specifically, as the single period Λ of the liquid crystal alignment pattern decreases, light components transmitted through the liquid crystal compounds 30 adjacent to each other more strongly interfere with each other. Therefore, the transmitted light components $L_2$ and $L_5$ can be more largely refracted.

In addition, refraction angles of the transmitted light components $L_2$ and $L_5$ with respect to the incidence light components $L_1$ and $L_4$ vary depending on the wavelengths of the incidence light components $L_1$ and $L_4$ (the transmitted light components $L_2$ and $L_5$). Specifically, as the wavelength of incidence light increases, the transmitted light is largely refracted. That is, in a case where incidence light is red light, green light, and blue light, the red light is refracted to the highest degree, and the blue light is refracted to the lowest degree.

Further, by reversing the rotation direction of the optical axis 30A of the liquid crystal compound 30 that rotates in the arrow X direction, the refraction direction of transmitted light can be reversed.

The optically-anisotropic layer 16 is formed of a cured layer of a liquid crystal composition including a rod-shaped liquid crystal compound or a disk-shaped liquid crystal compound, and has a liquid crystal alignment pattern in which an optical axis of the rod-shaped liquid crystal compound or an optical axis of the disk-shaped liquid crystal compound is aligned as described above.

By forming the alignment film 24 on the support 20, applying the liquid crystal composition to the alignment film 24, and curing the applied liquid crystal composition, the optically-anisotropic layer 16 consisting of the cured layer of the liquid crystal composition can be obtained. A method of applying the liquid crystal composition and a method of curing the liquid crystal composition are as described above.

Although the optically-anisotropic layer 16 functions as a so-called 212 plate, the present invention also includes an aspect where a laminate including the support 20 and the alignment film 24 that are integrated functions as a so-called 212 plate.

In addition, the liquid crystal composition for forming the optically-anisotropic layer 16 includes a rod-shaped liquid crystal compound or a disk-shaped liquid crystal compound and may further include other components such as a leveling agent, an alignment controller, a polymerization initiator, a crosslinking agent, or an alignment assistant. In addition, the liquid crystal composition may include a solvent.

As the rod-shaped liquid crystal compound, the disk-shaped liquid crystal compound, or the like in the liquid crystal composition for forming the optically-anisotropic layer 16, the same rod-shaped liquid crystal compound, the same disk-shaped liquid crystal compound, or the like as that in the liquid crystal composition for forming the optically-anisotropic layer 18 can be used.

That is, the liquid crystal composition for forming the optically-anisotropic layer 16 is the same as the liquid crystal composition for forming the optically-anisotropic layer 18, except that it includes a chiral agent.

In addition, it is preferable that the optically-anisotropic layer 16 has a wide range for the wavelength of incidence light and is formed of a liquid crystal material having a reverse birefringence dispersion. In addition, it is also preferable that the optically-anisotropic layer 16 can be made to have a substantially wide range for the wavelength of incidence light by imparting a twist component to the liquid crystal composition or by laminating different phase difference layers. For example, in the optically-anisotropic layer 16, a method of realizing a λ/2 plate having a wide-range pattern by laminating two liquid crystal layers having different twisted directions is disclosed in, for example, JP2014-089476A and can be preferably used in the present invention.

[Light Guide Element and AR Display Device]

A light guide element according to the embodiment of the present invention includes the above-described liquid crystal diffraction element and a light guide plate.

The Augmented Reality (AR) display device according to the embodiment of the present invention includes the light guide element and an image display device.

First Embodiment

Figure 11:
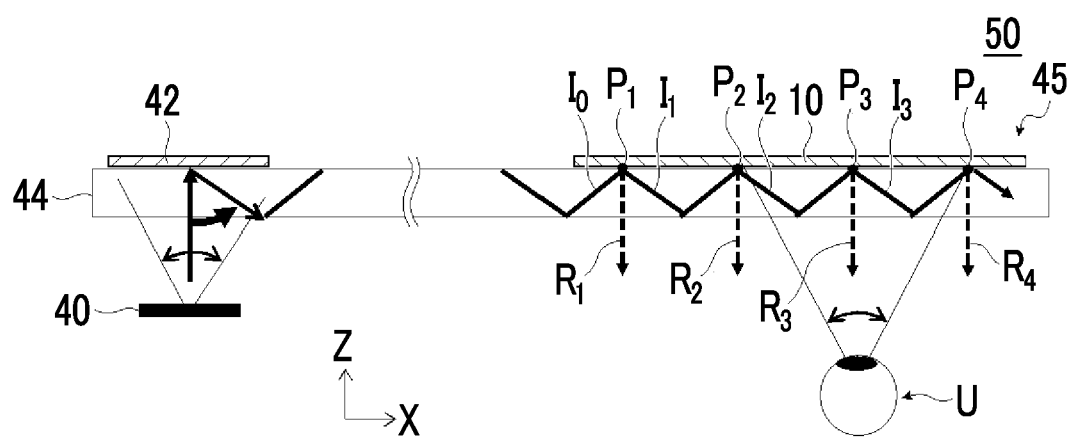
FIG. 11 is a diagram schematically showing an example of an AR display device in the liquid crystal diffraction element of FIG. 1.

FIG. 11 conceptually shows an example of the first embodiment of the AR display device according to the present invention.

An AR display device 50 shown in FIG. 11 includes a display (image display device) 40 and a light guide element 45.

The light guide element 45 is the light guide element according to the embodiment of the present invention and includes the liquid crystal diffraction element 10 according to the first embodiment of the present invention, a light guide plate 44, and a diffraction element 42.

The light guide plate 44 guides light in a rectangular shape that is elongated in one direction.

As shown in FIG. 11, the diffraction element 42 is disposed on a surface (main surface) of the light guide plate 44 on one end portion side in a longitudinal direction. In addition, the liquid crystal diffraction element 10 is disposed on a surface of the light guide plate 44 on another end portion side. The disposition position of the diffraction element 42 corresponds to a light incidence position of the light guide plate 44, and the disposition position of the liquid crystal diffraction element 10 corresponds to a light emission position of the light guide plate 44. In addition, the diffraction element 42 and the liquid crystal diffraction element 10 are disposed on the same surface of the light guide plate 44.

The light guide plate 44 is not particularly limited, and a well-known light guide plate of the related art that is used in an image display device or the like can be used.

The diffraction element 42 diffracts light emitted from the display 40 and incident into the light guide plate 44 such that the light is totally reflected in the light guide plate 44.

The diffraction element 42 is not particularly limited, and various diffraction elements used in an AR display device, for example, a relief type diffraction element, or a diffraction element using liquid crystal, can be used.

As shown in FIG. 11, the display 40 is disposed on a surface of one end portion of the light guide plate 44 opposite to the surface where the diffraction element 42 is disposed. In addition, a surface of the one end portion of the light guide plate 44 opposite to the surface where the liquid crystal diffraction element 10 is disposed is an observation position of a user U.

In the following description, the longitudinal direction of the light guide plate 44 will be referred to as "X direction", and a direction that is perpendicular to the X direction and perpendicular to the surface of the liquid crystal diffraction element 10 will be referred to as "Z direction". The Z direction may be a laminating direction of the respective layers of the liquid crystal diffraction element 10 (refer to FIG. 1).

The display 40 is not particularly limited. For example, various well-known displays used in an AR display device such as AR glasses can be used.

Examples of the display 40 include a liquid crystal display (LCOS including Liquid Crystal On Silicon), an organic electroluminescence display, and digital light processing (DLP).

The display 40 may display a monochrome image, a two-color image, or a color image.

In the AR display device 50 having the above-described configuration, as indicated by arrows, light displayed by the display 40 is incident into the light guide plate 44 from the surface of the one end portion of the light guide plate 44 opposite to the surface where the diffraction element 42 is disposed. The light incident into the light guide plate 44 is reflected from the diffraction element 42. In this case, the light is reflected in a direction having an angle different from that of a specular reflection direction due to the diffraction effect of the diffraction element 42 without being specularly reflected (regularly reflected). In the example shown in FIG. 11, light is incident from a direction (Z direction) substantially perpendicular to the diffraction element 42, and is reflected in a direction that is tilted with a large angle from the perpendicular direction toward the longitudinal direction (X direction) of the light guide plate 44.

Since the light reflected from the diffraction element 42 is reflected with a large angle with respect to the angle of the incidence light, an angle of a light traveling direction with respect to the surface of the light guide plate 44 is small. Therefore, the light is totally reflected from the both surfaces of the light guide plate 44 and is guided in the longitudinal direction (X direction) in the light guide plate 44.

The light guided in the light guide plate 44 is reflected from the liquid crystal diffraction element 10 in another end portion of the light guide plate 44 in the longitudinal direction. In this case, the light is reflected in a direction having an angle different from that of a specular reflection direction due to the diffraction effect of the liquid crystal diffraction element 10 without being specularly reflected. In the example shown in FIG. 11, the light is incident from an oblique direction with respect to the liquid crystal diffraction element 10 and is reflected in a direction perpendicular to the surface of the liquid crystal diffraction element 10.

The light reflected from the liquid crystal diffraction element 10 reaches the surface of the light guide plate 44 opposite to the surface where the liquid crystal diffraction element 10 is disposed, but is incident to be substantially perpendicular to the surface. Therefore, the light is emitted to the outside of the light guide plate 44 without being totally reflected. That is, the light is emitted to the observation position of the user U.

This way, in an AR display device 50, an image displayed by the display 40 is incident into one end of the light guide element 44, propagates in the light guide plate 44, and is emitted from another end of the light guide element 44 such that the virtual image is displayed to be superimposed on a scene that is actually being seen by the user U.

Here, in the light guide element 45, the diffraction efficiency of the liquid crystal diffraction element 10 is adjusted, and in a case where the light propagated in the light guide plate 44 is diffracted by the liquid crystal diffraction element 10, a part of the light is diffracted at a plurality of positions to be emitted to the outside of the light guide plate 44. As a result, the viewing zone can be expanded (exit pupil expansion).

Specifically, in FIG. 11, light $I_0$ propagated in the light guide plate 44 reaches the position of the liquid crystal diffraction element 10 while being repeatedly reflected from both surfaces (interface) of the light guide plate 44. A part of the light $I_0$ at the position of the liquid crystal diffraction element 10 is diffracted in a region $P_1$ close to the incidence side to be emitted from the light guide plate 44 (emitted light $R_1$). In addition, light $I_1$ that is not diffracted further propagates in the light guide plate 44, and partial light $R_2$ is diffracted at a position $P_2$ of the liquid crystal diffraction element 10 to emitted from the light guide plate 44. Light $I_2$ that is not diffracted further propagates in the light guide plate 44, and partial light $R_3$ is diffracted at a position $P_3$ of the liquid crystal diffraction element 10 to emitted from the light guide plate 44. In addition, light $I_3$ that is not diffracted further propagates in the light guide plate 44, and partial light $R_4$ is diffracted at a position $P_4$ of the liquid crystal diffraction element 10 to emitted from the light guide plate 44.

This way, with the configuration where the light propagated in the light guide plate 44 is diffracted by the liquid crystal diffraction element 10 at a plurality of positions to be emitted to the outside of the light guide plate 44, the viewing zone can be expanded (exit pupil expansion).

Here, a case where the diffraction efficiency of the liquid crystal diffraction element 10 is constant in a plane is assumed. In a case where the diffraction efficiency is constant, the light intensity (light amount) of the incident light $I_0$ is high in the region (position) $P_1$ close to the incidence side. Therefore, the intensity of the emitted light $R_1$ is also high. Next, the light $I_1$ that is not diffracted propagates in the light guide plate 44 and is diffracted again at the position $P_2$ of the liquid crystal diffraction element 10 such that the partial light $R_2$ is emitted. However, the intensity of the light $I_1$ is lower than that of the light $I_0$. Therefore, even in a case where the light components are diffracted with the same diffraction efficiency, the intensity of the light $R_2$ is lower than that of the light $R_1$ reflected from the region close to the incidence side. Likewise, the light $I_2$ that is not diffracted propagates in the light guide plate 44 and is diffracted again at the position $P_3$ of the liquid crystal diffraction element 10 such that the partial light $R_3$ is emitted. However, the intensity of the light $I_2$ is lower than that of the light $I_1$. Therefore, even in a case where the light components are diffracted with the same diffraction efficiency, the intensity of the light $R_3$ is lower than that of the light $R_2$ reflected from the position $P_2$. Further, the intensity of the light $R_4$ reflected from the region $P_4$ distant from the incidence side is lower than the light $R_3$.

Figure 12:
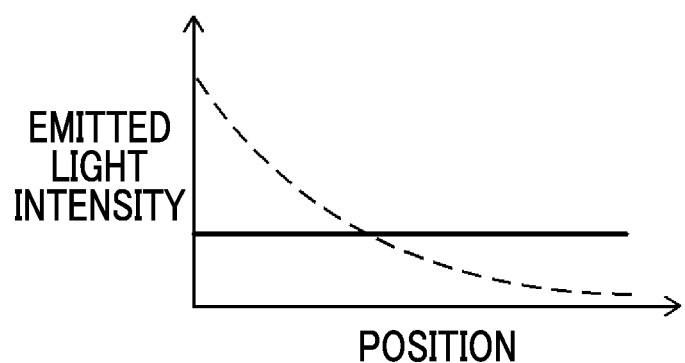
FIG. 12 is a graph conceptually showing a relationship a position and emitted light in the AR display device.

This way, in a case where the diffraction efficiency of the liquid crystal diffraction element 10 is constant in a plane, light having a high light intensity is emitted from the region close to the incidence side, and light having a low light intensity is emitted from the region distant from the incidence side. Therefore, there is a problem in that, as indicated by a broken line in FIG. 12, the intensity of emitted light is not uniform depending on positions.

On the other hand, the liquid crystal diffraction element 10 according to the embodiment of the present invention has the configuration in which the diffraction efficiency increases from one side to another side in the one in-plane direction in which the optical axis rotates (refer to FIG. 12), and the liquid crystal diffraction element 10 is disposed in the light guide element 45 such that the diffraction efficiency of the optically-anisotropic layer 18 increases in the light traveling direction in the light guide plate 44. That is, in the example shown in FIG. 11, the optically-anisotropic layer 18 of the liquid crystal diffraction element 10 is configured such that the diffraction efficiency increases from the left toward the right in FIG. 11.

In this case, at the position $P_1$ close to the incidence side, the intensity (light amount) of the incident light $I_0$ is high, but the diffraction efficiency is low. Therefore, the intensity of the emitted light $R_1$ is high to some extent. Next, the light $I_1$ that is not diffracted propagates in the light guide plate 44 and is diffracted again at the position $P_2$ of the liquid crystal diffraction element 10 such that the partial light $R_2$ is emitted. In this case, the intensity of the light $I_1$ is lower than that of the light $I_0$, but the diffraction efficiency at the position $P_2$ is higher than that at the position $P_1$. Therefore, the intensity of the light $R_2$ can be made to be the same as that of the light $R_1$ reflected from the position $P_1$. Likewise, the light $I_2$ that is not diffracted propagates in the light guide plate 44 and is diffracted again at the position $P_3$ of the liquid crystal diffraction element 10 such that the partial light $R_3$ is emitted. At this time, the intensity of the light $I_2$ is lower than that of the light $I_1$, but the diffraction efficiency at the position $P_3$ is higher than that at the position $P_2$. Therefore, the intensity of the light $R_3$ can be made to be the same as that of the light $R_2$ reflected from the position $P_2$. Further, the diffraction efficiency at the region $P_4$ distant from the incidence side is higher than that at the position $P_3$. Therefore, the intensity of the light $R_4$ can be made to be the same as that of the light $R_3$ reflected from the position $P_3$.

This way, the diffraction efficiency of the liquid crystal diffraction element 10 is configured to increase from one side to another side in the one in-plane direction in which the optical axis rotates. As a result, light having a constant light intensity can be emitted from any position of the liquid crystal diffraction element 10. Therefore, as indicated by a solid line in FIG. 12, the intensity of emitted light can be made uniform irrespective of positions.

In FIG. 11, light is indicated by an arrow, the light emitted from the display 40 may be a surface shape. The surface-shaped light propagates in the light guide plate 44 while maintaining a positional relationship, and is diffracted by the liquid crystal diffraction element 10.

In addition, in the description of FIG. 11, the liquid crystal diffraction element 10 includes one optically-anisotropic layer. The liquid crystal diffraction element 10 may include a plurality of optically-anisotropic layers. Alternatively, in the light guide element 45, a plurality of liquid crystal diffraction elements 10 including the single optically-anisotropic layer may be laminated.

In a case where the liquid crystal diffraction element 10 includes a plurality of optically-anisotropic layers, or in a case where the light guide element 45 includes a plurality of liquid crystal diffraction elements 10, that is, includes a plurality of optically-anisotropic layers, it is preferable that a plurality of optically-anisotropic layers having different selective reflection wavelengths are included. For example, the optical element may include optically-anisotropic layers having selective reflection wavelengths of red light, green light, and blue light. As a result, the liquid crystal diffraction element (the laminate thereof) can diffract red light, green light, and blue light, respectively, and the light guide element 45 can appropriately guide light of the display 40 that displays a color image.

Alternatively, the optical element may include two optically-anisotropic layers having the same selective reflection wavelength that reflect circularly polarized light components having opposite turning directions. For example, the optical element may include an optically-anisotropic layer that reflects right circularly polarized light of red light and an optically-anisotropic layer that reflects left circularly polarized light of red light. As a result, the liquid crystal diffraction element (the laminate thereof) can diffract right circularly polarized light and left circularly polarized light, respectively, and the light guide element 45 can guide right circularly polarized light and left circularly polarized light, and thus the light use efficiency can be improved.

In addition, in the example shown in FIG. 11, the light guide element 45 includes the diffraction element on each of the incidence side and the emission side. However, the present invention is not limited thereto, and an intermediate diffraction element may be provided. That is, a configuration may be configured in which light that is diffracted in the diffraction element for incidence and incident into the light guide plate is diffracted by the intermediate diffraction element such that a light traveling direction is bent in the light guide plate, and then is diffracted by the diffraction element on the emission side to be emitted to the outside of the light guide plate. In this case, the liquid crystal diffraction element according to the embodiment of the present invention can be used as the intermediate diffraction element. By using the liquid crystal diffraction element according to the embodiment of the present invention as the intermediate diffraction element, exit pupil expansion can be performed, and the amount of light to be expanded can be made to be uniform.

Second Embodiment

Next, a light guide element and an AR display device including the liquid crystal diffraction element according to the second embodiment will be described.

Figure 13:
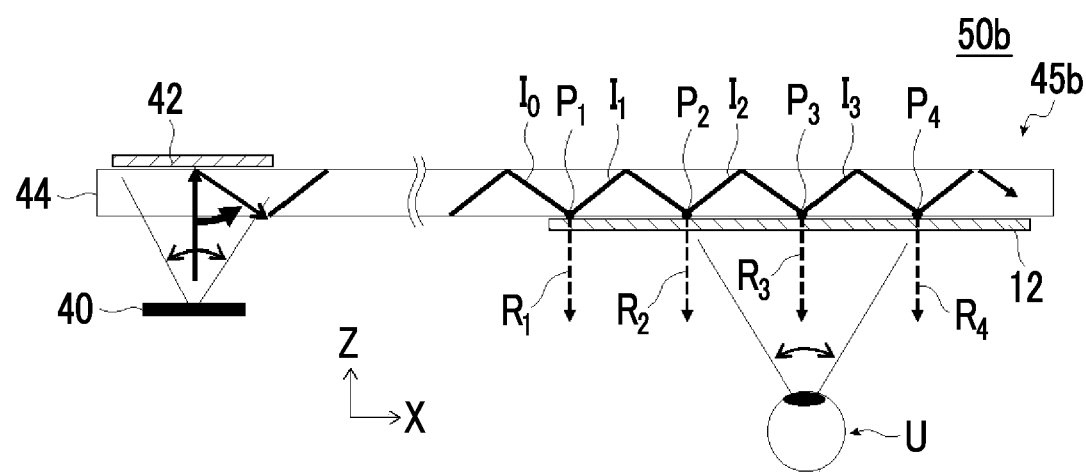
FIG. 13 is a diagram schematically showing an example of an AR display device in the liquid crystal diffraction element of FIG. 7.

FIG. 13 conceptually shows an example of the second embodiment of the AR display device according to the present invention.

An AR display device 50*b* shown in FIG. 13 includes the display 40 and a light guide element 45*b*.

The light guide element 45*b* is the light guide element according to the embodiment of the present invention and includes the liquid crystal diffraction element 12 according to the second embodiment of the present invention, the light guide plate 44, and the diffraction element 42.

Since the light guide plate 44 and the diffraction element 42 have the same configurations as those of the light guide plate 44 and the diffraction element 42, the description thereof will not be made.

As shown in FIG. 13, the diffraction element 42 is disposed on a surface (main surface) of the light guide plate 44 on one end portion side in a longitudinal direction. In addition, the liquid crystal diffraction element 12 is disposed on a surface of the light guide plate 44 on another end portion side. The disposition position of the diffraction element 42 corresponds to a light incidence position of the light guide plate 44, and the disposition position of the liquid crystal diffraction element 12 corresponds to a light emission position of the light guide plate 44. In addition, the diffraction element 42 and the liquid crystal diffraction element 12 are disposed on different surfaces of the light guide plate 44.

As shown in FIG. 13, the display 40 is disposed on a surface of one end portion of the light guide plate 44 opposite to the surface where the diffraction element 42 is disposed. In addition, a surface of the one end portion of the light guide plate 44 on the side where the liquid crystal diffraction element 10 is disposed is an observation position of a user U.

In the following description, the longitudinal direction of the light guide plate 44 will be referred to as "X direction", and a direction that is perpendicular to the X direction and perpendicular to the surface of the liquid crystal diffraction element 12 will be referred to as "Z direction". The Z direction may be a laminating direction of the respective layers of the liquid crystal diffraction element 10 (refer to FIG. 7).

In the AR display device 50*b* having the above-described configuration, as indicated by arrows, light displayed by the display 40 is incident into the light guide plate 44 from the surface of the one end portion of the light guide plate 44 opposite to the surface where the diffraction element 42 is disposed. The light incident into the light guide plate 44 is reflected from the diffraction element 42. In this case, the light is reflected in a direction having an angle different from that of a specular reflection direction due to the diffraction effect of the diffraction element 42 without being specularly reflected (regularly reflected). In the example shown in FIG. 13, light is incident from a direction (Z direction) substantially perpendicular to the diffraction element 42, and is reflected in a direction that is tilted with a large angle from the perpendicular direction toward the longitudinal direction (X direction) of the light guide plate 44.

Since the light reflected from the diffraction element 42 is reflected with a large angle with respect to the angle of the incidence light, an angle of a light traveling direction with respect to the surface of the light guide plate 44 is small. Therefore, the light is totally reflected from the both surfaces of the light guide plate 44 and is guided in the longitudinal direction (X direction) in the light guide plate 44.

The light guided in the light guide plate 44 is incident into and transmitted through the liquid crystal diffraction element 12 in another end portion of the light guide plate 44 in the longitudinal direction. In this case, the light is transmitted in a direction having an angle different a wavelength that of the incidence direction due to the diffraction effect of the liquid crystal diffraction element 10. In the example shown in FIG. 13, the light is incident from an oblique direction with respect to the liquid crystal diffraction element 12, transmits in a direction perpendicular to the surface of the liquid crystal diffraction element 12, and is emitted to the outside of the light guide plate 44. That is, the light is emitted to the observation position of the user U.

This way, in an AR display device 50*b*, an image displayed by the display 40 is incident into one end of the light guide element 44, propagates in the light guide plate 44, and is emitted from another end of the light guide element 44 such that the virtual image is displayed to be superimposed on a scene that is actually being seen by the user U.

Here, in the light guide element 45b, the diffraction efficiency of the liquid crystal diffraction element 12 is adjusted, and in a case where the light propagated in the light guide plate 44 is diffracted by the liquid crystal diffraction element 12, a part of the light is diffracted at a plurality of positions to be emitted to the outside of the light guide plate 44. As a result, the viewing zone can be expanded (exit pupil expansion).

Specifically, in FIG. 13, light $I_0$ propagated in the light guide plate 44 reaches the position of the liquid crystal diffraction element 12 while being repeatedly reflected from both surfaces (interface) of the light guide plate 44. A part of the light $I_0$ at the position of the liquid crystal diffraction element 12 is diffracted in a region $P_1$ close to the incidence side to be emitted from the light guide plate 44 (emitted light $R_1$). In addition, light $I_1$ that is not diffracted further propagates in the light guide plate 44, and partial light $R_2$ is diffracted at a position $P_2$ of the liquid crystal diffraction element 12 to emitted from the light guide plate 44. Light $I_2$ that is not diffracted further propagates in the light guide plate 44, and partial light $R_3$ is diffracted at a position $P_3$ of the liquid crystal diffraction element 12 to emitted from the light guide plate 44. In addition, light 13 that is not diffracted further propagates in the light guide plate 44, and partial light $R_4$ is diffracted at a position $P_4$ of the liquid crystal diffraction element 12 to emitted from the light guide plate 44.

This way, with the configuration where the light propagated in the light guide plate 44 is diffracted by the liquid crystal diffraction element 12 at a plurality of positions to be emitted to the outside of the light guide plate 44, the viewing zone can be expanded (exit pupil expansion).

Here, in a case where the diffraction efficiency of the liquid crystal diffraction element 12 is constant in a plane, as in the case of the above-described liquid crystal diffraction element 10, light having a high light intensity is emitted from the region close to the incidence side, and light having a low light intensity is emitted from the region distant from the incidence side. Therefore, there is a problem in that, as indicated by a broken line in FIG. 12, the intensity of emitted light is not uniform depending on positions.

On the other hand, the liquid crystal diffraction element 12 according to the embodiment of the present invention has the configuration in which the diffraction efficiency increases from one side to another side in the one in-plane direction in which the optical axis rotates, and the liquid crystal diffraction element 12 is disposed in the light guide element 45 such that the diffraction efficiency of the optically-anisotropic layer 18 increases in the light traveling direction in the light guide plate 44. That is, in the example shown in FIG. 13, the optically-anisotropic layer 18 of the liquid crystal diffraction element 12 is configured such that the diffraction efficiency increases from the left toward the right in FIG. 13.

In this case, as in the case of the above-described liquid crystal diffraction element 10, at the position $P_1$ close to the incidence side, the intensity (light amount) of the incident light $I_0$ is high, but the diffraction efficiency is low. Therefore, the intensity of the emitted light $R_1$ is high to some extent. Next, the light $I_1$ that is not diffracted propagates in the light guide plate 44 and is diffracted again at the position $P_2$ of the liquid crystal diffraction element 12 such that the partial light $R_2$ is emitted. In this case, the intensity of the light $I_1$ is lower than that of the light $I_0$, but the diffraction efficiency at the position $P_2$ is higher than that at the position $P_1$. Therefore, the intensity of the light $R_2$ can be made to be the same as that of the light $R_1$ reflected from the position $P_1$.

Likewise, the light $I_2$ that is not diffracted propagates in the light guide plate 44 and is diffracted again at the position $P_3$ of the liquid crystal diffraction element 10 such that the partial light $R_3$ is emitted. At this time, the intensity of the light $I_2$ is lower than that of the light $I_1$, but the diffraction efficiency at the position $P_3$ is higher than that at the position $P_2$. Therefore, the intensity of the light $R_3$ can be made to be the same as that of the light $R_2$ reflected from the position $P_2$. Further, the diffraction efficiency at the region $P_4$ distant from the incidence side is higher than that at the position $P_3$. Therefore, the intensity of the light $R_4$ can be made to be the same as that of the light $R_3$ reflected from the position $P_3$.

This way, the diffraction efficiency of the liquid crystal diffraction element 12 is configured to increase from one side to another side in the one in-plane direction in which the optical axis rotates. As a result, light having a constant light intensity can be emitted from any position of the liquid crystal diffraction element 12. Therefore, as indicated by a solid line in FIG. 12, the intensity of emitted light can be made uniform irrespective of positions.

A distribution of the diffraction efficiency of the optically-anisotropic layer may be appropriately set based on the length of the optically-anisotropic layer, the thickness of the light guide plate, the wavelength of light, the size of birefringence of the optically-anisotropic layer, and the like such that the intensity of emitted light can be made to be uniform.

In addition, the diffraction efficiency of the optically-anisotropic layer is preferably 3% to 50% and more preferably 5% to 20% in a region having a low diffraction efficiency, and is preferably 10% to 100% and more preferably 20% to 100% in a region having a high diffraction efficiency.

In addition, in a case where the diffraction efficiency of the optically-anisotropic layer is adjusted by adjusting the thickness, the thickness of the optically-anisotropic layer may be set depending on the distribution of the diffraction efficiency.

The thickness of the optically-anisotropic layer is preferably 0.05 to 2.0 μm and more preferably 0.1 to 1.0 μm in a region having a small thickness and is preferably 0.5 to 4.0 μm and more preferably 1.0 to 4.0 min in a region having a large thickness.

Likewise, in a case where the diffraction efficiency of the optically-anisotropic layer is adjusted by adjusting the thickness-direction retardation Rth, the thickness-direction retardation Rth of the optically-anisotropic layer may be set depending on the distribution of the diffraction efficiency.

In addition, the thickness-direction retardation Rth of the optically-anisotropic layer is preferably 3 to 150 nm and more preferably 5 to 80 nm in a region having a low diffraction efficiency, and is preferably 40 to 300 nm and more preferably 80 to 300 nm in a region having a high diffraction efficiency.

In FIGS. 11 and 13, a reflective type diffraction element is used as the diffraction element 42 on the incidence side. However, the present invention is not limited thereto, and a transmission type diffraction element may be provided. That is, the diffraction element 42 may be configured to be disposed on the surface of the light guide plate 44 on the display 40 side.

[Method of Forming Optically-Anisotropic Layer]

Next, (i) a method of forming the optically-anisotropic layer having the configuration in which the thickness increases from one side to another side in the one in-plane direction in which the optical axis rotates and (ii) a method of forming the optically-anisotropic layer having the configuration in which the thickness-direction retardation Rth increases from one side to another side in the one in-plane direction in which the optical axis rotates will be described.

(Method of Forming Optically-Anisotropic Layer in which Thickness Changes)

The method of forming the optically-anisotropic layer having the configuration in which the thickness increases from one side to another side in the one in-plane direction in which the optical axis rotates will be described using FIG. 14.

The method of forming the optically-anisotropic layer in which the thickness changes includes: a step S1 of preparing the alignment film 24 in which the alignment pattern is formed on the support 20; a step S2 of applying the liquid crystal composition to the alignment film 24 to form a composition layer 18a; a step S3 of exposing the composition layer 18a through a gradation mask MK; and a step S4 of applying the liquid crystal composition to the exposed composition layer 18a, in which by repeating the steps S3 and S4, the optically-anisotropic layer 18 having a gradient in thickness at a predetermined thickness is formed (S5).

That is, in the method of forming the optically-anisotropic layer, the optically-anisotropic layer 18 is formed through the plurality of steps, and the optically-anisotropic layer 18 having the configuration in which a plurality of thin films are laminated is formed.

In the step S1 of preparing the alignment film 24 in which the alignment pattern is formed, as described above, the alignment film is applied to the surface of the support 20, is dried, and is exposed to laser light using an exposure device shown in FIG. 3 to form the alignment pattern.

In the step S2, the liquid crystal composition is applied to the alignment film 24 to form the composition layer 18a. Here, in the method of forming the optically-anisotropic layer, the optically-anisotropic layer 18 is formed through the plurality of steps. Therefore, the thickness of the composition layer 18a formed by performing the application once may be appropriately set depending on the thickness of the optically-anisotropic layer 18 that is finally formed and the total number of the thin films.

The liquid crystal composition and the application method are as described above.

In addition, the liquid crystal compound in the applied composition layer 18a forms the liquid crystal alignment pattern in which the direction of the optical axis changes while continuously rotating in the one in-plane direction according to the alignment pattern formed in the alignment film 24.

After the step S2, the composition layer may be heated to promote the alignment of the liquid crystal compound.

In the step S3, the composition layer 18a is exposed and cured. Here, in the step S3, the composition layer 18a is exposed through the gradation mask MK. The gradation mask MK is a mask in which the transmittance of light (ultraviolet light) to be exposed changes in a plane. The amount of light with which the composition layer 18a is irradiated by being exposed through the gradation mask MK varies depending on positions.

For example, the gradation mask MK has a configuration in which the transmittance decreases from one side to another side in a direction corresponding to the one in-plane direction in which optical axis rotates in the alignment pattern formed on the alignment film 24, that is, in the one in-plane direction in which the optical axis rotates.

In a case where the exposure is performed using the gradation mask MK, on the other side (the left side in S3 of FIG. 14) in the one in-plane direction in which the optical axis rotates, the composition layer 18a is irradiated with and exposed to a sufficient amount of light. Therefore, the curing of the liquid crystal composition progresses. On the other hand, on the one side (the right side in S3 of FIG. 14), the amount of light with which the composition layer 18a is irradiated through the gradation mask MK decreases. Therefore, the liquid crystal composition is not sufficiently exposed and is not sufficiently cured.

Next, in the step S4, the liquid crystal composition is applied to the composition layer 18a exposed in the step S3 to form a composition layer 18b.

Here, in the composition layer 18a, the curing progresses on the one side, but the curing is not sufficient on the other side. Therefore, for example, in a case where the liquid crystal composition is applied, the non-cured liquid crystal composition flows out, and the thickness of the composition layer 18a in a region where the curing is not sufficient is small. Therefore, the thickness of the composition layer 18a changes in the one in-plane direction in which the optical axis rotates.

In addition, the liquid crystal compound in the applied composition layer 18b forms the liquid crystal alignment pattern in which the direction of the optical axis changes while continuously rotating in the one in-plane direction according to the liquid crystal alignment pattern of the composition layer 18a.

Next, the composition layer 18b formed on the composition layer 18a is exposed. In this case, as in the step S3, the composition layer 18b is exposed using the gradation mask MK. As a result, in the composition layer 18b, as in the composition layer 18a, the curing progresses on the other side, and the curing is not sufficient on the one side.

Further, the liquid crystal composition is applied to the composition layer 18b to form the composition layer 18b. By repeating the exposure using the gradation mask MK, the optically-anisotropic layer 18 having a desired thickness is prepared. Here, in the composition layers (18a and 18b) that are formed through the plurality of steps, the thickness of the composition layer 18a increases from one side to another side in the one in-plane direction in which the optical axis rotates. The optically-anisotropic layer 18 formed by laminating the composition layers has the configuration in which the thickness increases from one side to another side in the one in-plane direction in which the optical axis rotates as shown in S5 of FIG. 14.

As a result, the optically-anisotropic layer 18 can adopt the configuration the diffraction efficiency increases from one side toward another side in the one in-plane direction in which the optical axis rotates.

In the method of forming the above-described optically-anisotropic layer in which the thickness changes, a gradient is given to the irradiation dose of ultraviolet light on the composition layer using the gradation mask MK. However, the present invention is not limited to this configuration, and a gradient may be given to the irradiation dose by changing the irradiation time or the irradiation intensity depending on positions.

(Method of Forming Optically-Anisotropic Layer in which Thickness-Direction Retardation Rth Changes)

Figure 15:
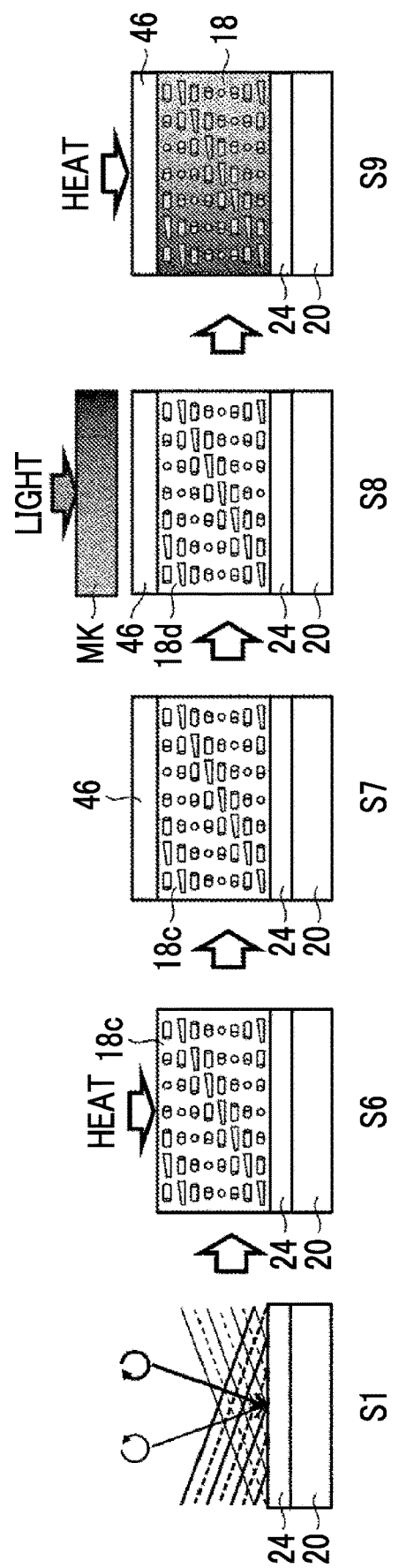
FIG. 15 is a diagram showing another method of preparing the optically-anisotropic layer.

The method of forming the optically-anisotropic layer having the configuration in which the thickness-direction retardation Rth increases from one side to another side in the one in-plane direction in which the optical axis rotates will be described using FIG. 15.

The method of forming the optically-anisotropic layer in which the thickness-direction retardation Rth changes includes: the step S1 of preparing the alignment film 24 in which the alignment pattern is formed on the support 20; a step S6 of applying the liquid crystal composition to the alignment film 24 to form a composition layer 18c and heating the composition layer 18c; a step S7 of applying and forming an initiator supply layer 46 on the composition layer 18c; a step S8 of exposing the composition layer 18c through the gradation mask MK; and a step S9 of calcinating the composition layer 18c.

Here, the method of forming the optically-anisotropic layer includes two kinds of curing including: curing the composition layer 18c by heating (step S6); and curing the composition layer 18c by ultraviolet irradiation (step S8).

Accordingly, it is preferable that the liquid crystal composition forming the optically-anisotropic layer has two or more reactive groups having different polymerization conditions; and it is more preferable that the liquid crystal composition forming the optically-anisotropic layer includes a liquid crystal compound having at least one radical reactive group and at least one cationic reactive group.

As the liquid crystal compound having at least one radical reactive group and at least one cationic reactive group, for example, a compound described in paragraphs "0037" to "0043" of JP2009-175208A can be used.

Figure 14:
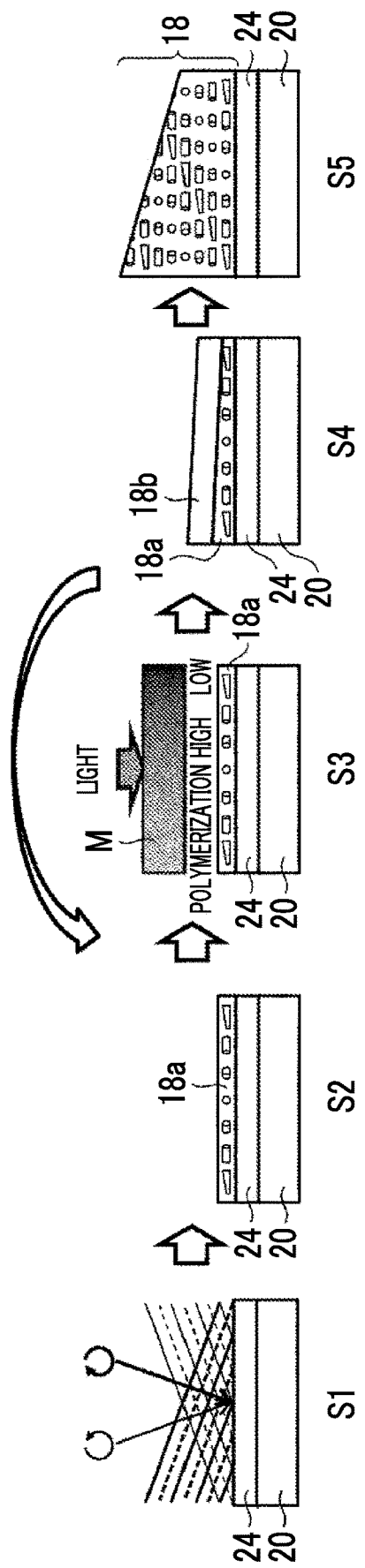
FIG. 14 is a diagram showing a method of preparing the optically-anisotropic layer.

Since the step S1 is the same as the step in FIG. 14, the description thereof will not be made.

In the step S6, the liquid crystal composition is applied to the alignment film 24 and is heated to form the composition layer 18c. An application method and a heating method are as described above.

In addition, the liquid crystal compound in the applied composition layer 18c forms the liquid crystal alignment pattern in which the direction of the optical axis changes while continuously rotating in the one in-plane direction according to the alignment pattern formed in the alignment film 24.

The liquid crystal composition includes the liquid crystal compound that is polymerizable by heating. Therefore, by heating the liquid crystal composition, the thermally curing of the composition layer 18c progresses. The liquid crystal compound in the liquid crystal composition corresponds to two kinds of curing including curing by heating and curing by ultraviolet irradiation, and thus is not completely cured only by heating.

Next, in the step S7, the initiator supply layer 46 is formed on the composition layer 18c.

The initiator supply layer 46 includes an initiator for performing photocuring (polymerization) in the next step S8.

As a material of the initiator supply layer 46, a polymerization initiator for photocuring the liquid crystal compound in the composition layer 18c may be included.

As a method of applying the initiator supply layer 46, a printing method such as ink jet or scroll printing or a well-known method such as spin coating, bar coating, or spray coating capable of uniformly applying liquid to a sheet-shaped material can be used.

In addition, the thickness of the initiator supply layer 46 is not limited.

In the step S8, the composition layer 18c is exposed and photocured. Here, in the step S8, the composition layer 18c is exposed through the gradation mask MK. The gradation mask MK is a mask in which the transmittance of light (ultraviolet light) to be exposed changes in a plane. The amount of light with which the composition layer 18c is irradiated by being exposed through the gradation mask MK varies depending on positions.

For example, the gradation mask MK has a configuration in which the transmittance decreases from one side to another side in a direction corresponding to the one in-plane direction in which optical axis rotates in the alignment pattern formed on the alignment film 24, that is, in the one in-plane direction in which the optical axis rotates.

In a case where the exposure is performed using the gradation mask MK, on the other side (the left side in S8 of FIG. 15) in the one in-plane direction in which the optical axis rotates, the composition layer 18c is irradiated with and exposed to a sufficient amount of light. Therefore, the photocuring of the liquid crystal composition progresses. On the other hand, on the one side (the right side in S8 of FIG. 15), the amount of light with which the composition layer 18c is irradiated through the gradation mask MK decreases. Therefore, the liquid crystal composition is not sufficiently exposed and is not sufficiently photocured.

Next, in the step S10, the composition layer 18c exposed in the step S9 is calcinated.

Here, in the composition layer 18c, the photocuring progresses on the other side, but the photocuring is not sufficient on the one side. Therefore, in a case where the composition layer 18c is calcinated, the state does not change in the region where the photocuring progresses. In the region where the photocuring does not progress, the liquid crystal compound moves such that the alignment is disordered. As described above, in a region where the alignment of the liquid crystal compound is disordered, the thickness-direction retardation Rth decreases. Therefore, the thickness-direction retardation Rth of the calcinated composition layer 18c (optically-anisotropic layer 18) is configured to change in the one in-plane direction in which the optical axis rotates.

As a result, in the optically-anisotropic layer 18, the diffraction efficiency can be changed in the one in-plane direction in which the optical axis rotates.

In the method of forming the optically-anisotropic layer in which the thickness-direction retardation Rth changes, the liquid crystal composition is thermally cured in the step S6 and is photocured in the step S9. However, the present invention is not limited to this configuration, and two kinds of curing having different polymerization conditions may be performed. For example, the liquid crystal composition may be photocured in the first curing and may be photocured using a reactive group different from that in the first curing.

In all the above-described liquid crystal diffraction elements according to the embodiment of the present invention, the optical axis 30A of the liquid crystal compound 30 in the liquid crystal alignment pattern of the optically-anisotropic layer continuously rotates only in the arrow X direction.

However, the present invention is not limited thereto, and various configurations can be used as long as the optical axis 30A of the liquid crystal compound 30 in the optically-anisotropic layer continuously rotates in the one in-plane direction.

The liquid crystal diffraction element according to the embodiment of the present invention can be used for various uses where light is reflected at an angle other than the angle of specular reflection, for example, an optical path changing member, a light collecting element, a light diffusing element to a predetermined direction, a diffraction element, or the like in an optical device.

In the above-described example, the liquid crystal diffraction element according to the embodiment of the present invention is used as the liquid crystal diffraction element that reflects visible light. However, the present invention is not limited to this example, and various configurations can be used.

For example, the liquid crystal diffraction element according to the embodiment of the present invention also may be configured to reflect infrared light or ultraviolet light or to reflect only light other than visible light.

Hereinabove, the liquid crystal diffraction element and the light guide element according to the embodiment of the present invention have been described in detail. However, the present invention is not limited to the above-described examples, and various improvements and modifications can be made within a range not departing from the scope of the present invention.

EXAMPLES

Hereinafter, the characteristics of the present invention will be described in detail using examples. Materials, chemicals, used amounts, material amounts, ratios, treatment details, treatment procedures, and the like shown in the following examples can be appropriately changed within a range not departing from the scope of the present invention. Accordingly, the scope of the present invention is not limited to the following specific examples.

<Preparation of Diffraction Element 1>

(Formation of Alignment Film)

A glass substrate was used as a support, and the following alignment film-forming coating solution was applied to the glass substrate. The application was performed using a spin coater at 2500 rpm.

The support on which the coating film of the alignment film-forming coating solution was formed was dried using a hot plate at 60° C. for 60 seconds. As a result, an alignment film was formed.

| Alignment Film-Forming Coating Solution | |
|---|---|
| The following material for photo-alignment | 1.00 part by mass |
| Water | 16.00 parts by mass |
| Butoxyethanol | 42.00 parts by mass |
| Propylene glycol monomethyl ether | 42.00 parts by mass |
| -Material for Photo-Alignment- | |

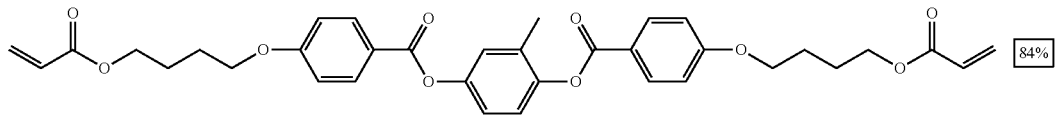

Next, the alignment film was exposed using the exposure device shown in FIG. 3 to form an alignment film P-1 having an alignment pattern.

In the exposure device, a laser that emits laser light having a wavelength (325 nm) was used as the laser. The exposure dose of the interference light was 300 mJ/cm². The single period (the length over which the optical axis rotates by 180°) of an alignment pattern formed by interference of two laser beams was controlled to be 0.44 μm by changing an intersecting angle (intersecting angle α) between the two beams.

(Formation of Optically-Anisotropic Layer 1)

As a liquid crystal composition forming an optically-anisotropic layer 1, the following composition LC-1 was prepared.

| Composition LC-1 | |
|---|---|
| Rod-shaped liquid crystal compound L-1 | 100.00 parts by mass |
| Polymerization initiator | 3.00 parts by mass |
| (IRGACURE (registered trade name) 907, | |
| manufactured by BASF SE) | |
| Photosensitizer (KAYACURE DETX-S, | 1.00 part by mass |
| manufactured by Nippon Kayaku Co., Ltd.) | |
| Chiral agent Ch-1 | 5.20 parts by mass |
| Leveling agent T-1 | 0.08 parts by mass |
| Methyl ethyl ketone | 255.00 parts by mass |

-Rod-shaped Liquid Crystal Compound L-1-

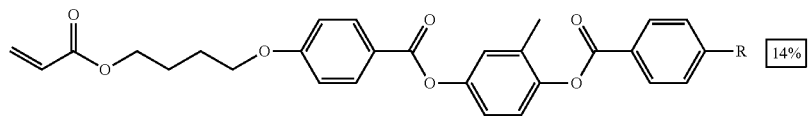

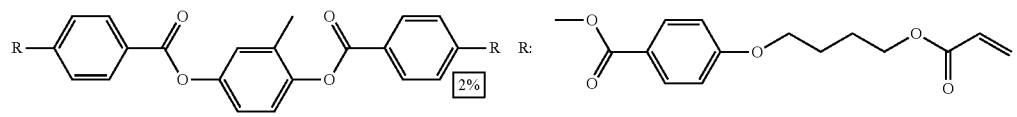

-continued

-Chiral agent Ch-1-

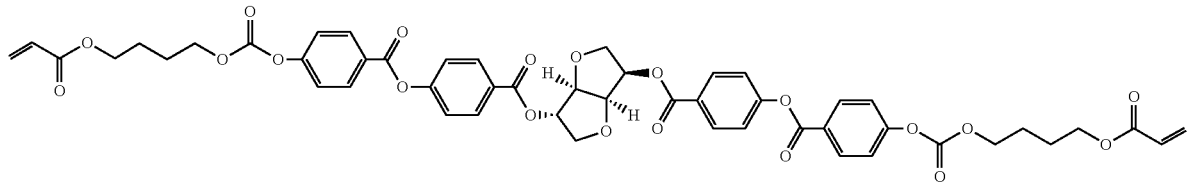 [SMILES: C=CC(=O)OCCCCOC(=O)Oc1ccc(C(=O)Oc2ccc(C(=O)O[C@H]3CO[C@H]4[C@@H]3OC[C@H]4OC(=O)c3ccc(OC(=O)c4ccc(OC(=O)OCCCCOC(=O)C=C)cc4)cc3)cc2)cc1]

-Leveling agent T-1-

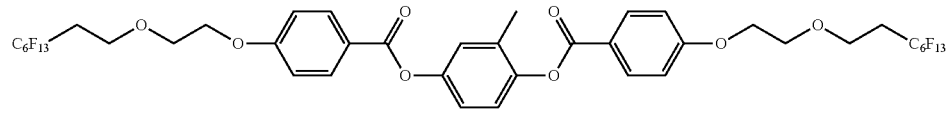

The prepared composition LC-1 was applied to the alignment film P-1 to form a composition layer. The application was performed using a spin coater at 800 rpm.

The support including the composition layer was heated using a hot plate at 80° C. for 3 minutes, and the coating film was further irradiated at 80° C. with ultraviolet light having a wavelength of 365 nm at an irradiation dose of 300 mJ/cm$^2$ using a high-pressure mercury lamp in a nitrogen atmosphere. As a result, the alignment of the liquid crystal compound was immobilized, and the optically-anisotropic layer 1 was formed. The optically-anisotropic layer 1 was prepared such that the thickness thereof was 4 µm.

As a result, a diffraction element 1 was prepared.

Example 1

<Preparation of Liquid Crystal Diffraction Element>

A support and an alignment film were the same as those of the diffraction element 1.

(Formation of Optically-Anisotropic Layer 2)

As a liquid crystal composition forming an optically-anisotropic layer 2, the following composition LC-2 was prepared.

| Composition LC-2 | |
| --- | --- |
| Rod-shaped liquid crystal compound L-1 | 100.00 parts by mass |
| Polymerization initiator (IRGACURE (registered trade name) 907, manufactured by BASF SE) | 3.00 parts by mass |
| Photosensitizer (KAYACURE DETX-S, manufactured by Nippon Kayaku Co., Ltd.) | 1.00 part by mass |
| Chiral agent Ch-1 | 5.20 parts by mass |
| Leveling agent T-1 | 0.08 parts by mass |
| Methyl ethyl ketone | 1572.00 parts by mass |

The optically-anisotropic layer 2 was formed by applying multiple layers. That is, as shown in FIG. 14, the optically-anisotropic layer 2 was formed by repeating the following processes including: preparing a first composition layer (hereinafter also referred to as liquid crystal immobilized layer) by applying the liquid crystal composition to the alignment film, heating the liquid crystal composition, and irradiating the liquid crystal composition with ultraviolet light for curing; and preparing a second or subsequent liquid crystal immobilized layer by applying the liquid crystal composition to the liquid crystal immobilized layer, heating the liquid crystal composition, and irradiating the liquid crystal composition with ultraviolet light for curing as described above. Even in a case where the optically-anisotropic layer 2 was formed by the application of the multiple layers such that the total thickness of the optically-anisotropic layer 2 was large, the alignment pattern of the alignment film was reflected from a lower surface of the optically-anisotropic layer 2 to an upper surface thereof.

Figure 16:
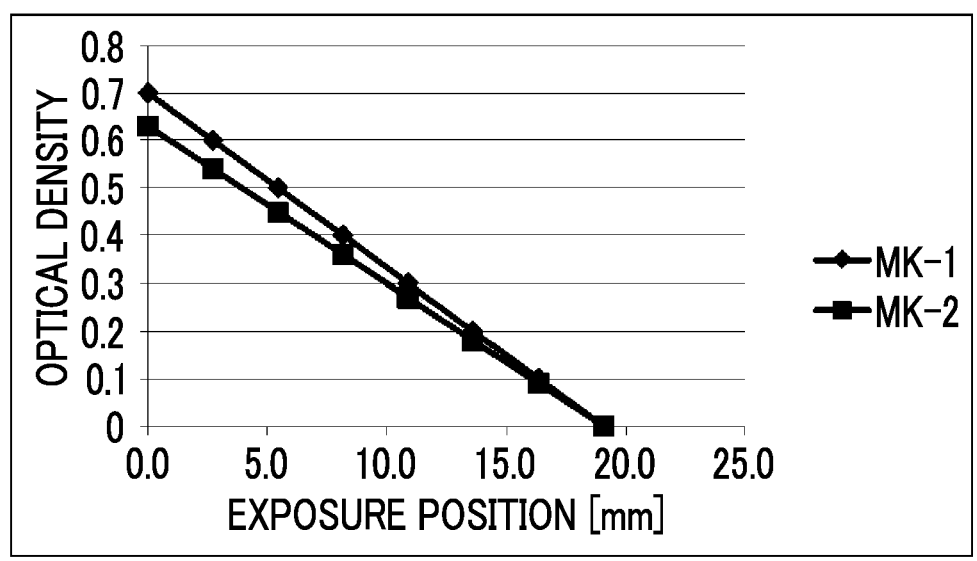
FIG. 16 is a graph showing a relationship between an exposure position and an optical density.
Figure 17:
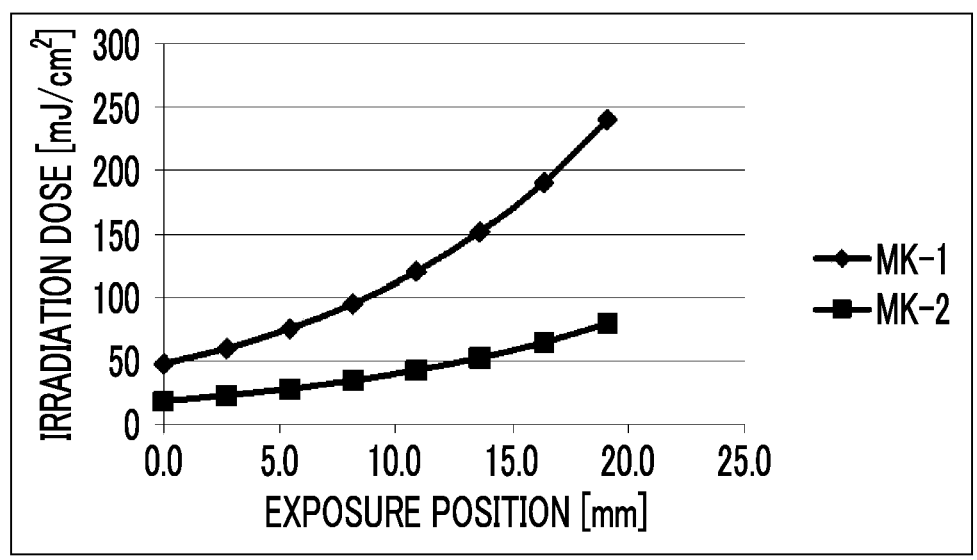
FIG. 17 is a graph showing a relationship between an exposure position and an irradiation dose.

The prepared composition LC-2 was applied to the alignment film P-1 to form a composition layer. The application was performed using a spin coater at 1000 rpm. The support including the composition layer was heated using a hot plate at 80° C. for 3 minutes, and the coating film was further irradiated at 80° C. with ultraviolet light having a wavelength of 365 nm at an irradiation dose of 240 mJ/cm$^2$ using a high-pressure mercury lamp in a nitrogen atmosphere. Here, during the irradiation with ultraviolet light, a gradation mask MK-1 was disposed on the composition layer (between the composition layer and the light source), and the irradiation dose was changed depending on positions. A relationship between an exposure position of the gradation mask MK-1 and an optical density is as shown in FIG. 16. In addition, the irradiation dose of ultraviolet light with which the composition layer was irradiated through the gradation mask MK-1 is as shown in FIG. 17.

Next, the composition LC-2 was applied to the first liquid crystal immobilized layer, and was heated and irradiated with ultraviolet light under the same conditions as those of the first liquid crystal immobilized layer to form a second liquid crystal immobilized layer.

Likewise, the composition LC-2 was applied to the second liquid crystal immobilized layer, and was heated and irradiated with ultraviolet light under the same conditions as those of the first liquid crystal immobilized layer to form a third liquid crystal immobilized layer.

The composition LC-2 was applied to the third liquid crystal immobilized layer, was heated under the same conditions as those of the first liquid crystal immobilized layer, and was irradiated with ultraviolet light without the gradation mask MK-1 to than a fourth liquid crystal immobilized layer.

Through the above-described steps, the liquid crystal diffraction element including the optically-anisotropic layer 2 was prepared.

Figure 18:
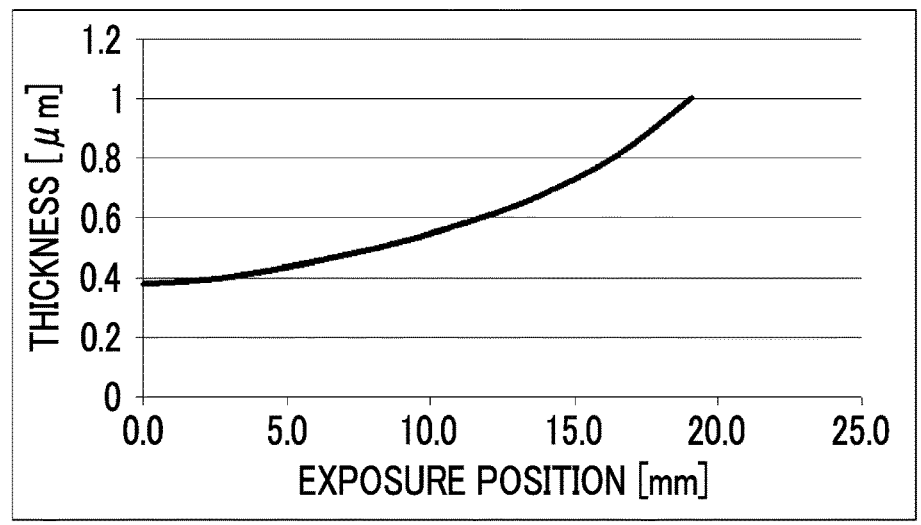
FIG. 18 is a graph showing a relationship between an exposure position and a thickness.

In a case where a thickness distribution of the optically-anisotropic layer 2 was measured, the thickness distribution was as shown in FIG. 18. The thickness of one end portion was about 0.4 µm, and the thickness of another end portion was about 1 µm.

Figure 19:
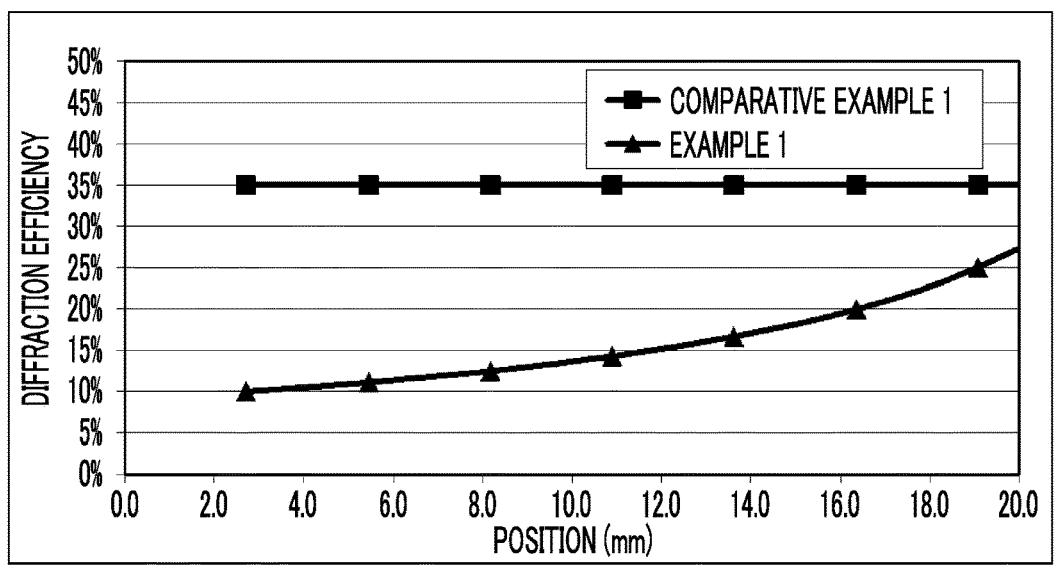
FIG. 19 is a graph showing a relationship between a position and a diffraction efficiency.

In addition, in a case where a diffraction efficiency distribution of the optically-anisotropic layer 2 was measured as described above while adjusting a sample position such that an incidence position of laser light was present at a designated position, the distribution was as shown in FIG. 19. That is, the optically-anisotropic layer 2 has a configuration in which a diffraction efficiency increases from one side to another side in the one in-plane direction in which the optical axis derived from the liquid crystal compound rotates.

Comparative Example 1

A liquid crystal optical element was prepared using the same method as that of Example 1, except that, during the formation of the optically-anisotropic layer, the first to fourth liquid crystal immobilized layers were exposed at an irradiation dose of 500 mJ/cm$^2$ without a gradation mask in the exposure step to form an optically-anisotropic layer 3.

The thickness of the optically-anisotropic layer 3 was constant at 4 μm over the entire region. In a case where a diffraction efficiency distribution of the optically-anisotropic layer 3 was measured, the diffraction efficiency distribution was as shown in FIG. 19. The diffraction efficiency of the optically-anisotropic layer 3 was constant over the entire region (35%).

[Evaluation]
(Emitted Light Intensity Distribution)

Figure 20:
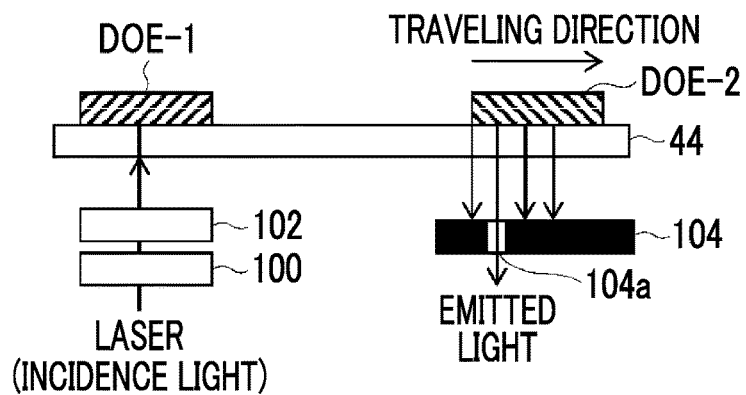
FIG. 20 is a diagram showing a method of measuring an emitted light intensity in Examples.

As shown in FIG. 20, each of the diffraction elements and the liquid crystal diffraction elements prepared as described above was disposed on a surface of the light guide plate 44 to prepare a light guide element. In FIG. 20, the diffraction element was disposed on a surface (position of DOE-1) of one end portion of the light guide plate 44, and the liquid crystal diffraction element was disposed on a surface (position of DOE-2) of another end portion of the light guide plate 44.

As the light guide plate 44, a glass light guide plate having a refractive index of 1.5 and a thickness of 1 mm was used.

In addition, the diffraction element and the liquid crystal diffraction element were peeled off from the glass substrate. In addition, the diffraction element, the liquid crystal diffraction element, and the light guide plate 44 were bonded to each other using a heat-sensitive adhesive.

In addition, the diffraction element and the liquid crystal diffraction element were disposed such that directions of in-plane periods of the liquid crystal alignment patterns were antiparallel to each other.

As shown in FIG. 20, in the end portion of the light guide plate 44 on the side where the diffraction element was disposed, a laser was disposed to face a surface opposite to the surface where the diffraction element was disposed such that a linear polarizer 100 and an λ/4 plate 102 were disposed between the laser and the light guide plate 44.

On the other hand, in the end portion of the light guide plate 44 on the side where the liquid crystal diffraction element was disposed, a light screen 104 was disposed to face a surface opposite to the surface where the liquid crystal diffraction element was disposed. In the light screen 104, a pinhole 104a having a diameter of 2 mm was formed.

In a case where light is emitted from the laser, the light transmitted through the linear polarizer 100 and the λ/4 plate 102 to be converted into right circularly polarized light, and the right circularly polarized light was incident into the light guide plate 44. The light incident into the light guide plate 44 was incident into the diffraction grating of DOE-1.

The diffracted light that was reflected and diffracted due to the diffraction effect and the selective reflection effect of the diffraction grating of DOE-1 propagated in the light guide plate 44. The light propagated in the light guide plate 44 was diffracted and reflected in the liquid crystal diffraction element of DOE-2 to be emitted in the direction of the light screen 104.

The intensity (emitted light intensity) of the light emitted from the light guide plate 44 was measured through the pinhole 104a of the light screen 104. By changing the position of the pinhole 104a, the emitted light intensity was measured at each position of the liquid crystal diffraction element of DOE-2. The emitted light intensity was measured using a Power Meter 1918-C (manufactured by Newport Corporation). A ratio of the emitted light intensity to the incidence light intensity at each position was shown in FIG. 21. In addition, preparation conditions of Example 1 and Comparative Example 1 are shown in Table 1.

TABLE 1

|  |  |  |  | Comparative Example 1 | | Example 1 | |
|---|---|---|---|---|---|---|---|
| Substrate |  |  |  | Glass Substrate | | Glass Substrate | |
| Alignment Film | Composition |  |  | PA-1 | | PA-1 | |
|  | Application Step | Rotation Speed | [rpm] | 2500 | | 2500 | |
|  |  | Time | [sec] | 30 | | 30 | |
|  | Drying Step | Temperature | [° C.] | 60 | | 60 | |
|  |  | Time | [sec] | 60 | | 60 | |
|  | Exposure Step | Laser Wavelength | [nm] | 325 | | 325 | |
|  |  | Set Angle α | [deg.] | 43.3 | | 43.3 | |
|  |  | In-Plane Period Λ | [um] | 0.44 | | 0.44 | |
|  |  | Irradiation Dose | [mJ/cm2] | 300 | | 300 | |
| Optically-Anisotropic Layer | Composition |  |  | LC-2 | | LC-2 | |
|  |  | Liquid Crystal Compound | [Part(s) by Mass] | L-1 | 100 | L-1 | 100 |
|  |  | Polymerization Initiator | [Part(s) by Mass] | Irgacure907 | 3 | Irgacure907 | 3 |
|  |  | Photosensitizer | [Part(s) by Mass] | KYACURE DETX-S | 1 | KYACURE DETX-S | 1 |
|  |  | Leveling Agent | [Part(s) by Mass] | T-1 | 0.08 | T-1 | 0.08 |
|  |  | Chiral Agent | [Part(s) by Mass] | Ch-1 | 5.2 | Ch-1 | 5.2 |

TABLE 1-continued

|  |  |  | Comparative Example 1 | Example 1 |
|---|---|---|---|---|
|  | Solvent | [Part(s) by Mass] | MEK 1572.0 | MEK 1572.0 |
|  | Concentration of Solid Contents | [wt %] | 6.5 | 6.5 |
| Application Step | Rotation Speed | [rpm] | 1000 | 1000 |
|  | Time | [sec] | 10 | 10 |
| Heating Step | Temperature | [° C.] | 80 | 80 |
|  | Time | [sec] | 180 | 180 |
| Exposure Step | Mask |  | None | MK-1 |
|  | Temperature | [° C.] | 80 | 80 |
|  | Exposure Wavelength | [nm] | 365 | 365 |
|  | Irradiation Dose | [mJ/cm2] | 300 | 300 |
|  | Environment |  | In Nitrogen Atmosphere | In Nitrogen Atmosphere |
| Number of Times of Application |  |  | 4 | 4 |

Figure 21:
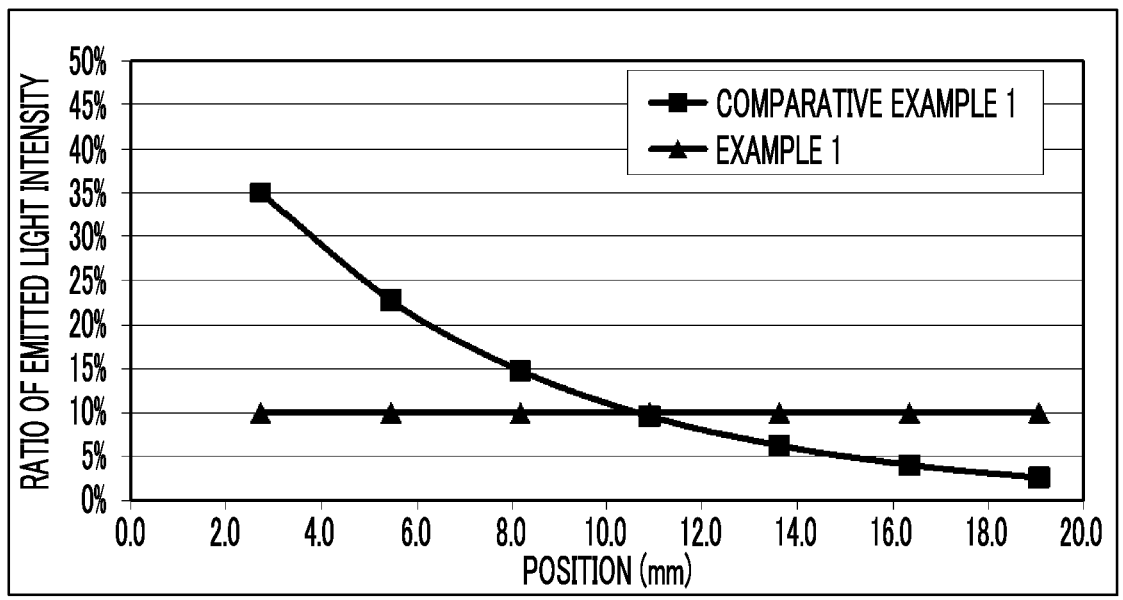
FIG. 21 is a graph showing a relationship between a position and an ratio of an emitted light intensity.

As shown in FIG. 21, it can be seen that, in Comparative Example 1 where the diffraction efficiency was constant in a plane, the intensity of the emitted light varied depending on positions and was non-uniform. On the other hand, it can be seen that, since Example 1 according to the embodiment of the present invention had the configuration in which the diffraction efficiency increased from one side to another side in the one in-plane direction in which the optical axis rotated, the intensity of the emitted light was constant irrespective of positions and was uniform.

Example 2

<Preparation of Liquid Crystal Diffraction Element>

A support and an alignment film were the same as those of the diffraction element 1.

(Formation of Optically-Anisotropic Layer 4)

As a liquid crystal composition forming an optically-anisotropic layer 4, the following composition LC-3 was prepared, was filtered through a filter formed of polypropylene having a pore size of 0.2 μm, and was used as an optically-anisotropic layer-forming coating solution LC-3.

(Preparation of Transparent Resin Layer-Forming Coating Solution CL-1)

The following composition was prepared, was filtered through a filter formed of polypropylene having a pore size of 0.2 μm, and was used as a transparent resin layer-forming coating solution CL-1.

B-4 is a copolymer of benzyl methacrylate and methacrylic acid, in which the copolymerization composition ratio (molar ratio) was 72.0/28.0 and the weight-average molecular weight was 38000.

| Composition CL-1 | |
|---|---|
| Binder (B-4) | 11.57 parts by mass |
| NK ESTER A-BPE-10 (manufactured by Shin-Nakamura Chemical Co., Ltd.) | 1.30 parts by mass |
| Radical photopolymerization initiator (RPI-1) | 0.12 parts by mass |
| Hydroquinone monomethyl ether | 0.002 parts by mass |
| MEGAFAC F-176PF (manufactured by DIC Corporation) | 0.05 parts by mass |
| Methyl ethyl ketone | 86.96 parts by mass |

| Composition LC-3 | |
|---|---|
| Rod-shaped liquid crystal compound LC-2-1 | 100.00 parts by mass |
| Cationic photopolymerization initiator (Cyracure UVI6974, manufactured by Dow) | 2.00 parts by mass |
| Horizontal alignment agent LC-1-2 | 0.06 parts by mass |
| Chiral agent Ch-1 | 5.00 parts by mass |
| Methyl ethyl ketone | 249.8 parts by mass |

-Rod-shaped Liquid Crystal Compound LC-2-1-

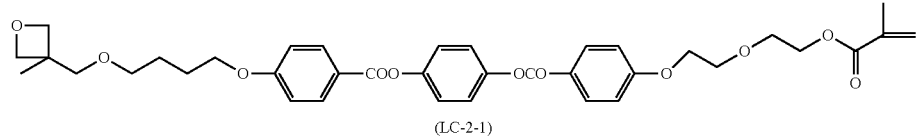

(LC-2-1)

LC-2-1 is a liquid crystal compound having two reactive groups. Among the two reactive groups, one reactive group is a methacrylic group as a radical reactive group, and another reactive group is an oxetane group as a cationic reactive group.

The optically-anisotropic layer-forming coating solution LC-3 was applied to the alignment film P-1, was dried at a film surface temperature of 90° C. for 2 minutes to form a liquid crystal phase state, was irradiated with ultraviolet light using an air-cooled metal halide lamp (manufactured by Eye Graphics Co., Ltd.) of 160 W/cm in air to immobilize the alignment state. As a result, an optically-anisotropic layer having a thickness of 1.5 μm was formed. In this case, the illuminance of the ultraviolet light used was 50 mW/cm² in the UV-B band (cumulative value in a wavelength range of 280 nm to 320 nm), and the irradiation dose was 120 mJ/cm² in the UV-B band.

Further, the transparent resin layer-forming coating solution CL-1 was further applied to the optically-anisotropic layer and dried to form a transparent resin layer having a thickness of 1.2 μm. This transparent resin layer corresponds to the initiator supply layer.

Next, a gradation mask MK-2 was disposed on the transparent resin layer, and the composition layer was exposed through the gradation mask MK-2. Using an air-cooled metal halide lamp (manufactured by Eye Graphics Co., Ltd.), the composition layer was irradiated with ultraviolet light at an irradiation dose of 80 mJ/cm². A relationship between an exposure position of the gradation mask MK-2 and an optical density is as shown in FIG. 16. In addition, the irradiation dose of ultraviolet light with which the composition layer was irradiated through the gradation mask MK-2 is as shown in FIG. 17.

Next, the composition layer was baked using a clean oven at 230° C. for 1 hour.

Through the above-described steps, the liquid crystal diffraction element including the optically-anisotropic layer 4 was prepared.

Preparation conditions of Example 2 are shown in Table 2.

Figure 22:
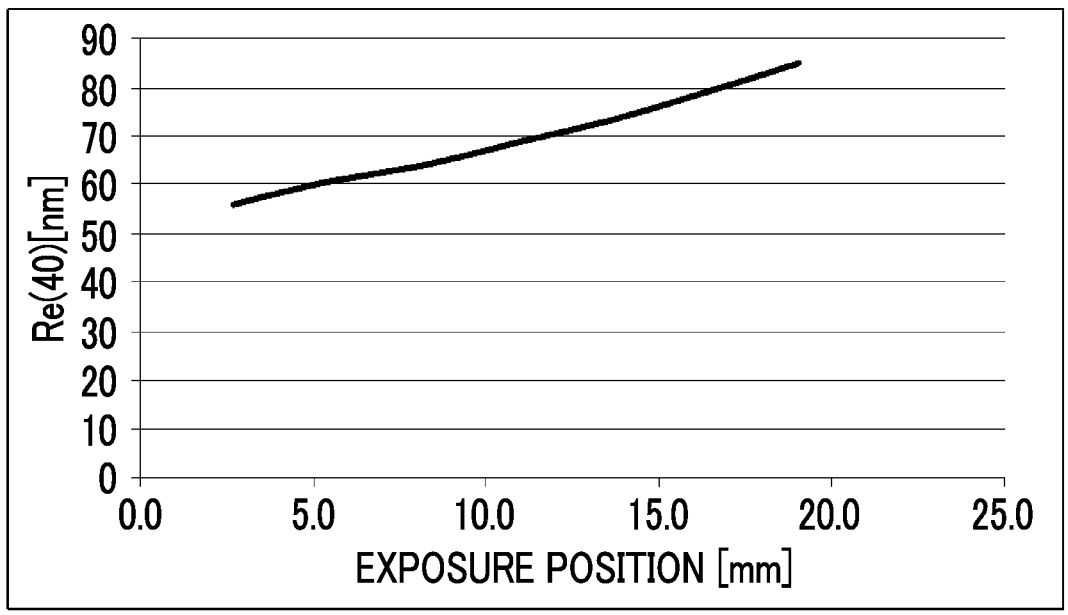
FIG. 22 is a graph showing a relationship between an exposure position and an estimated Δn.

In a case where an oblique-direction retardation Re(40) distribution of the optically-anisotropic layer 4 was measured, the oblique retardation Re(40) distribution was as shown in FIG. 22. The Re(40) distribution was measured using "Axoscan" (manufactured by Axometrics, Inc.).

[Evaluation]

(Emitted Light Intensity Distribution)

The liquid crystal diffraction element prepared in Example 2 was disposed at the position of DOE-2, and the emitted light intensity distribution was measured as described above.

Figure 23:
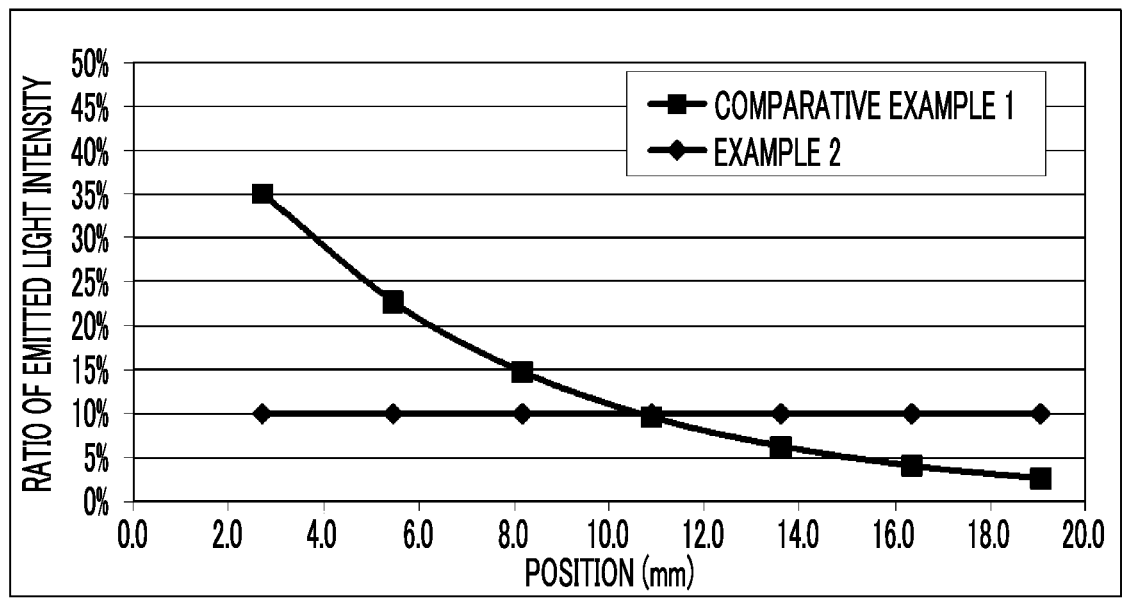
FIG. 23 is a graph showing a relationship between a position and a ratio of an emitted light intensity.

The results are shown in FIG. 23.

It can be seen from FIG. 23 that, since Example 2 according to the embodiment of the present invention had the configuration in which the diffraction efficiency increased from one side to another side in the one in-plane direction in which the optical axis rotated, the intensity of the emitted light was constant irrespective of positions and was uniform.

The present invention is suitably applicable to various uses where light is reflected in an optical device, for example, a diffraction element that causes light to be incident into a light guide plate of AR glasses or emits light to the light guide plate.

TABLE 2

|  |  |  |  | Example 2 |  |
|---|---|---|---|---|---|
| Substrate |  |  |  | Glass Substrate |  |
| Alignment Film | Composition |  |  | PA-1 |  |
|  | Application Step | Rotation Speed | [rpm] | 2500 |  |
|  |  | Time | [sec] | 30 |  |
|  | Drying Step | Temperature | [° C.] | 60 |  |
|  |  | Time | [sec] | 60 |  |
|  | Exposure Step | Laser Wavelength | [nm] | 325 |  |
|  |  | Set Angle α | [deg.] | 43.3 |  |
|  |  | In-Plane Period Λ | [um] | 0.44 |  |
|  |  | Irradiation Dose | [mJ/cm2] | 300 |  |
| Optically-Anisotropic Layer | Composition |  |  | LC-3 |  |
|  |  | Liquid Crystal Compound | [Part(s) by Mass] | Rod-Shaped Liquid Crystal (LC-2-1) | 100 |
|  |  | Polymerization Initiator | [Part(s) by Mass] | Cationic Photopolymerization Initiator (Cyracure UVI6974, manufactured by Dow) | 2 |
|  |  | Photosensitizer | [Part(s) by Mass] |  |  |
|  |  | Leveling Agent | [Part(s) by Mass] | Horizontal Alignment Agent (LC-1-2) | 0.06 |
|  |  | Chiral Agent | [Part(s) by Mass] | Ch-1 | 5 |
|  |  | Solvent | [Part(s) by Mass] | MEK | 249.8 |
|  |  | Concentration of Solid Contents | [wt %] | 30 |  |
|  | Heating Step | Temperature | [° C.] | 90 |  |
|  |  | Time | [sec] | 2 |  |
|  | Exposure Step | Temperature | [° C.] | 25 |  |
|  |  | Exposure Wavelength | [nm] | 280-320 |  |
|  |  | Irradiation Dose | [mJ/cm2] | 120 |  |
|  |  | Environment |  | In Air |  |
|  | Transparent Resin Layer Application Step |  |  |  |  |
|  | Exposure Step | Mask |  | MK-2 |  |
|  |  | Temperature | [° C.] | 25 |  |
|  |  | Exposure Wavelength | [nm] | 365 |  |
|  |  | Irradiation Dose | [mJ/cm2] | 80 |  |
|  | Calcination Step | Temperature | [° C.] | 230 |  |
|  |  | Time | [min] | 60 |  |

| Explanation of References |
| --- |
| 10, 12: liquid crystal diffraction element |
| 16, 18: optically-anisotropic layer |
| 18a to 18d: composition layer |
| 20: support |
| 24: alignment film |
| 30: liquid crystal compound |
| 30A: optical axis |
| 40: display (image display device) |
| 42: diffraction element |
| 44: light guide plate |
| 45, 45b: light guide element |
| 50, 50b: AR display device |
| 60: exposure device |
| 62: laser |
| 64: light source |
| 68: beam splitter |
| 70A, 70B: mirror |
| 72A, 72B: λ/4 plate |
| 100: linear polarizer |
| 102: λ/4 plate |
| 104: light screen |
| 104a: pinhole |
| 110: dove prism |
| 112: linear polarizer |
| 114: λ/4 plate |
| M: laser light |
| MA, MB: beam |
| $P_O$: linearly polarized light |
| $P_R$: right circularly polarized light |
| $P_L$: left circularly polarized light |
| α: intersecting angle |
| Q: absolute phase |
| E: equiphase surface |
| $L_1, L_4$: incidence light |
| $L_2, L_5$: reflected light |
| $R_R$: right circularly polarized light of red light |
| MK: gradation mask |
| $I_0$ to $I_3$: light propagated in light guide plate |
| $P_1$ to $P_4$: position |
| $R_1$ to $R_4$: light |

What is claimed is:

1. A liquid crystal diffraction element comprising:
an optically-anisotropic layer that is formed of a composition including a liquid crystal compound,
wherein the optically-anisotropic layer has a liquid crystal alignment pattern in which a direction of an optical axis derived from the liquid crystal compound continuously rotates in at least one in-plane direction,
a thickness-direction retardation Rth of the optically-anisotropic layer increases from one side to another side in the one in-plane direction such that a diffraction efficiency of the optically-anisotropic layer continuously increases from one side to another side in the one in-plane direction, and
the liquid crystal compound has at least one radical reactive group and at least one cationic reactive group.

2. The liquid crystal diffraction element according to claim 1,
wherein the optically-anisotropic layer has a liquid crystal alignment pattern in which a direction of an optical axis derived from the liquid crystal compound continuously rotates in one in-plane direction.

3. The liquid crystal diffraction element according to claim 2,
wherein a diffraction efficiency of the optically-anisotropic layer continuously increases from one side to another side in the one in-plane direction.

4. The liquid crystal diffraction element according to claim 2,
wherein a diffraction efficiency of the optically-anisotropic layer increases stepwise from one side to another side in the one in-plane direction.

5. The liquid crystal diffraction element according to claim 2,
wherein in the optically-anisotropic layer, the liquid crystal compound is cholesterically aligned.

6. A light guide element comprising:
a light guide plate; and
the liquid crystal diffraction element according to claim 2 that is disposed on a surface of the light guide plate,
wherein the liquid crystal diffraction element is disposed such that a diffraction efficiency of the optically-anisotropic layer increases in a traveling direction of light in the light guide plate.

7. An AR display device comprising:
the light guide element according to claim 6; and
an image display device.

8. The liquid crystal diffraction element according to claim 1,
wherein in the optically-anisotropic layer, the liquid crystal compound is cholesterically aligned.

9. A light guide element comprising:
a light guide plate; and
the liquid crystal diffraction element according to claim 1 that is disposed on a surface of the light guide plate,
wherein the liquid crystal diffraction element is disposed such that a diffraction efficiency of the optically-anisotropic layer increases in a traveling direction of light in the light guide plate.

10. An AR display device comprising:
the light guide element according to claim 9; and
an image display device.

* * * * *